(12) United States Patent
Sawant et al.

(10) Patent No.: US 12,454,495 B2
(45) Date of Patent: Oct. 28, 2025

(54) CROP NUTRITION AND FORTIFICATION COMPOSITION

(71) Applicants: Arun Vitthal Sawant, Thane (IN); Thankapan Vadakekuttu, Navi Mumbai (IN)

(72) Inventors: Arun Vitthal Sawant, Thane (IN); Thankapan Vadakekuttu, Navi Mumbai (IN)

(73) Assignee: SML Limitied, Mumbai (IN)

( * ) Notice: Subject to any disclaimer, the term of this patent is extended or adjusted under 35 U.S.C. 154(b) by 773 days.

(21) Appl. No.: 17/054,137

(22) PCT Filed: May 10, 2019

(86) PCT No.: PCT/IB2019/053881
§ 371 (c)(1),
(2) Date: Nov. 9, 2020

(87) PCT Pub. No.: WO2019/215697
PCT Pub. Date: Nov. 14, 2019

(65) Prior Publication Data
US 2021/0122681 A1    Apr. 29, 2021

(30) Foreign Application Priority Data

May 10, 2018  (WO) ............... PCT/IB2018/053251
Nov. 6, 2018  (IN) ............................ 201821042030

(51) Int. Cl.
| | |
|---|---|
| C05D 9/02 | (2006.01) |
| C05G 1/00 | (2006.01) |
| C05G 3/30 | (2020.01) |
| C05G 3/50 | (2020.01) |
| C05G 3/60 | (2020.01) |
| C05G 3/70 | (2020.01) |
| C05G 3/80 | (2020.01) |
| C05G 5/12 | (2020.01) |
| C05G 5/27 | (2020.01) |

(52) U.S. Cl.
CPC ............... *C05G 3/50* (2020.02); *C05D 9/02* (2013.01); *C05G 1/00* (2013.01); *C05G 3/30* (2020.02); *C05G 3/60* (2020.02); *C05G 3/70* (2020.02); *C05G 3/80* (2020.02); *C05G 5/12* (2020.02); *C05G 5/27* (2020.02)

(58) Field of Classification Search
CPC ... C05G 3/50; C05G 1/00; C05G 3/30; C05G 3/60; C05G 3/70; C05G 3/80; C05G 5/12; C05G 5/27; C05D 9/02; C05D 5/00
See application file for complete search history.

(56) References Cited

U.S. PATENT DOCUMENTS

| | | | | |
|---|---|---|---|---|
| 5,072,022 A | * | 12/1991 | Bakos | .................... C07C 69/94 560/65 |
| 6,749,659 B1 | | 6/2004 | Yu et al. | |
| 8,241,387 B2 | | 8/2012 | Shah | |
| 8,801,827 B2 | | 8/2014 | Taylor et al. | |
| 10,492,489 B2 | * | 12/2019 | Vadakekuttu | ............ C05G 3/60 |
| 11,414,357 B2 | * | 8/2022 | Sawant | .................... A01P 3/00 |
| 11,465,946 B2 | * | 10/2022 | Sawant | ................... C05B 17/00 |
| 2005/0076686 A1 | * | 4/2005 | Tidow | ....................... C05D 9/00 71/54 |
| 2014/0060131 A1 | * | 3/2014 | Shah | ........................ C05G 3/50 71/27 |
| 2017/0283334 A1 | | 10/2017 | Rohrer et al. | |
| 2018/0029945 A1 | | 2/2018 | Miranda Valencia | |
| 2021/0114949 A1 | | 4/2021 | Sawant et al. | |
| 2021/0188726 A1 | * | 6/2021 | Sawant | ................... C05F 11/10 |

FOREIGN PATENT DOCUMENTS

| | | | | |
|---|---|---|---|---|
| GB | 2195993 A | * | 4/1988 | .............. C05D 9/02 |
| GB | 2513232 A | | 10/2014 | |
| WO | WO-9627571 A1 | * | 9/1996 | .............. C05B 1/00 |
| WO | 2008084495 A1 | | 7/2008 | |
| WO | 2009125435 A2 | | 10/2009 | |
| WO | 2012131702 A1 | | 10/2012 | |
| WO | 2016113665 A1 | | 7/2016 | |
| WO | 2016183685 A1 | | 11/2016 | |

OTHER PUBLICATIONS

ChemBK, Dimanganese trioxide, obtained online at: https://www.chembk.com/en/chem/Dimanganese%20trioxide, dowloaded on Dec. 30, 2024. (Year: 2024).*
International Search Report from PCT/IB2019/053881 dated Aug. 21, 2019.
International Search Report from PCT/IB2018/053251 dated Aug. 17, 2018.

* cited by examiner

*Primary Examiner* — Abigail Vanhorn
(74) *Attorney, Agent, or Firm* — Melissa M. Hayworth; E. Joseph Gess; Merchant & Gould, P.C.

(57) ABSTRACT

The invention relates to a water dispersible granular composition comprising of 0.1% to 70% by weight of manganese salts, complexes, derivatives or mixtures thereof, 1% to 90% by weight of elemental sulphur and 1% to 30% by weight of dispersing agent, with granules in a size range of 0.1-2.5 mm and comprising particles in the range of 0.1-20 microns. The invention further relates to liquid suspension composition comprising 0.1% to 55% by weight of manganese salts, complexes, derivatives or mixtures thereof, 1% to 60% by weight of elemental sulphur, at least one structuring agent and at least one surfactant, where the composition has particle size range of 0.1-20 microns. The invention further relates to a process of preparing the crop nutrition and fortification composition and to a method of treating the plants, seeds, crops, plant propagation material, locus, parts thereof or the soil with the composition.

9 Claims, 1 Drawing Sheet

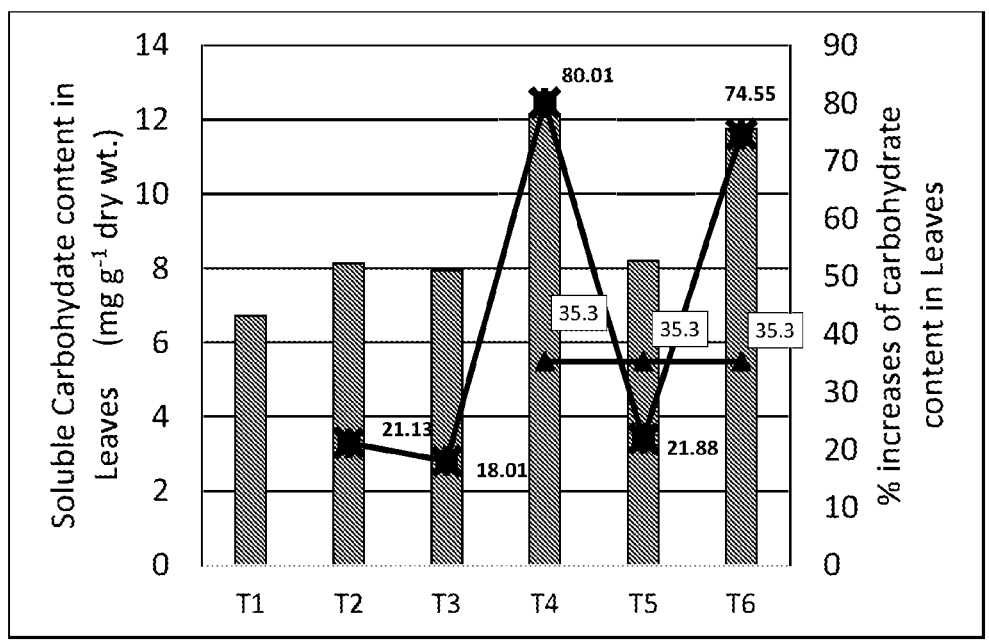

CROP NUTRITION AND FORTIFICATION COMPOSITION

RELATED APPLICATIONS

The present application is a U.S. National Stage filing under 35 U.S.C. § 371 of PCT/IB2019/053881 filed 10 May 2019, which claims priority to Indian application Ser. No. 20/182,1042030 filed 6 Nov. 2018 and to PCT/IB2018/053251 filed 10 May 2018, the contents of all of which are incorporated herein by reference in their entireties.

1. FIELD OF THE INVENTION

The invention relates to a crop nutrition and fortification composition comprising effective amount of one or more of manganese salts, complexes, derivatives or mixtures thereof, elemental sulphur and at least one agrochemically acceptable excipient. The composition has a particle size in the range of about 0.1 micron-20 microns. More particularly, the invention relates to a crop nutrition and fortification composition in the form of a liquid suspension which includes effective amount of one or more of manganese salts, complexes, derivatives or mixtures thereof; elemental sulphur; at least one structuring agent and at least one agrochemically acceptable excipient, wherein the liquid suspension composition has a particle size in the range of about 0.1-20 microns. The invention further relates to a water dispersible granular composition comprising one or more of manganese salts, complexes, derivatives or mixtures thereof; elemental sulphur and at least one dispersing agent, wherein the water dispersible granular composition has granules in the size range of 0.1 mm to 2.5 mm and has a particle size in the range of 0.1-20 microns. Furthermore, the invention relates to a process of preparing the crop nutrition and fortification composition in the form of water dispersible granules and liquid suspension and also to a method of treating the plants, seeds, crops, plant propagation material, locus, parts thereof or the soil with the crop nutrition and fortification composition.

2. BACKGROUND OF THE INVENTION

In describing the embodiments of the invention, specific terminology is chosen for the sake of clarity. However, it is not intended that the invention be limited to the specific terms so selected and it is to be understood that each specific term includes all technical equivalents that operate in a similar manner to accomplish a similar purpose.

Various metal ions are essential elements in plant nutrition and soil fertility and deficiency thereof is very often the cause of poor plant growth and development. Of particular importance for plant growth are iron, manganese, copper, zinc, boron and such other micronutrients. It is observed that intensive agriculture and increased productivity of agricultural crops has been taking place to meet the food and nutritional requirement of the growing population, resulting in depletion of soil fertility. Micronutrient deficiency in soil, particularly that of manganese has been emerging out widespread in most of agricultural soils across the world due to intensive agriculture and increased food productivity.

Manganese (Mn) is an essential nutrient element required for plant growth and reproduction, and which is needed by the plants, however, in relatively small amounts, thus making it a micronutrient. Manganese is a component of enzymes and is also involved in photosynthesis, respiration, chloroplast formation, synthesis of some enzymes and nitrogen assimilation. Manganese is also involved in pollen germination, pollen tube growth, root cell elongation and resistance to pest and diseases. Additionally, it is involved in plant nitrogen fixation.

Furthermore, multinutrient deficiency in soil and plants due to imbalanced fertilization and interaction of nutrients, where one nutrient inhibits or enhances the availability of other nutrients, is another big concern in agriculture, to meet the nutrition requirement and increase the productivity of the crops.

Manganese deficiency in plants is commonly responsible for interveinal chlorosis (yellowing of leaves with green veins) on the young leaves, and sometimes tan, sunken spots that appear in the chlorotic areas between the veins. Plant growth may also be reduced and stunted due to manganese deficiency. Moreover, poor manganese nutrition also results in poor nodulation of legume crops, leading to reduced plant growth and productivity. Manganese is relatively immobile once incorporated into the tissues in the upper parts of the plants, and as a result, the translocation of manganese from one plant part to another is restricted. Manganese deficiency is more pronounced when there is a pH imbalance in the soil and manganese becomes unavailable for uptake. Deficiency can also occur from low fertilizer application rates, use of general purpose fertilizers (which typically have reduced micronutrient contents and due to excessive leaching of nutrients. The impact of manganese deficiencies in cereal crops (wheat, barley and oats), legumes (common beans, peas and soybean), stone fruits (apples, cherries and peaches), palm crops, citrus, potatoes, sugar beets and canola, among others, includes reduced dry matter production and yield, weaker structural resistance against pathogens and a reduced tolerance to drought and heat stress. In the case of dicots, manganese deficiency first results in pale mottled leaves, followed by typical interveinal chlorosis. Under severe manganese deficiency dicots may also develop a number of brownish spots. In cereals, manganese deficiency can cause pale green or yellow patches in younger leaves. This condition is known as gray speck, and is characterized by necrotic spots that form in older leaves.

Moreover, managing the manganese nutrition of crops is difficult due to factors such as carbonate levels in the soil, salinity, soil moisture, type of irrigation water, agronomic practices, type of fertilizers, soil alkalinity, low temperature, and such other factors. Hence there is a need to provide manganese in optimized proportion to the crops or the soil so as to increase the uptake by the plants in a synergistic manner.

Also the ability of the plants to respond to manganese availability ultimately affects human nutrition, both in terms of crop yield and the manganese concentration in the edible tissues. Therefore, proper manganese nutrition in appropriate concentrations and dosages is critical for optimizing the plant nutrition and metabolism, which in turn contributes to the crop yield and quality.

Various fertilizers with either straight manganese fertilizer or manganese fortified fertilizer with various other nutrient elements, are available in the market to meet the manganese requirement of the plants.

It is observed that known manganese fertilizers do not provide for efficient use of the nutrients, leading to reduced availability or uptake of manganese by the plants. Consequently, large quantity of manganese fertilizers are needed to be applied, to meet small manganese requirement of plants. Such fertilizers lead to inadequate supply of manganese to the plant, are more prone to leaching loses and exhibit negative interactions with other nutrient elements thus inhibiting the availability of required nutrients to the plant if not used in optimized dosages.

Furthermore, known manganese based compositions in the form of pellets, pastilles, etc. have a larger size distribution, resulting in their poorer suspensibility, uneven distribution in the soil and uneven coverage on the crop. Further, these conventional fertilizers are available in forms, which are not completely soluble or do not disperse adequately. This presents a great challenge to the user and the environment. As these compositions are not completely soluble, they leave behind a residue. Such commercially available manganese based compositions also tend to either settle or sediment at the bottom of the packaging or the container from which it is to be applied, thereby failing to exhibit desired results, spreadability, and lack uniform distribution of the components to the crops for right uptake.

Also the role of sulphur as an essential and a growing nutrient and fertilizer has been long known. The most cost effective approach to introduce sulphur to soil is to use sulphur as elemental sulphur as it is 100% Sulphur. Teachings in the art would motivate a skilled person to prepare compositions with larger particle size as milling of elemental sulphur may pose explosion or fire hazards and thus incorporating elemental sulphur at reduced particle size in the composition remains a greater challenge. Conventionally, sulphur based compositions known in the art such as bentonite granules and sulphur pellets, have larger particle size.

There is a need to make agricultural fertilizers composition more efficient, thereby inhibiting conversion to forms that are less stable in the soil, or enhancing availability of nutrients to the plants. Efficiency of manganese fertilizer compositions has to be increased to enhance the uptake of manganese by the plants.

Agricultural compositions which include fertilizer and micronutrients are known in the art. Such compositions mostly talk about milling or crushing of only the insoluble micronutrients, so as to form a fine powder or dust. However, milling of only insoluble micronutrients and mixing other fertilizers, micronutrients and excipients later would lead to non-uniform blend of actives in the formulation which may not be desirable in terms of its application and also poor uptake of the nutrients by the plants.

Further, pastilles or pellets of micronutrients such as manganese and sulphur include swelling clays whereby the pellets or pastilles swell on coming in contact with moisture and thereby disintegrate to release the actives. Such pellets or pastilles lead to irregular release of the micronutrients, resulting in poorer field efficacy in crops. Again such pastille compositions are only suitable for broadcast applications, owing to disadvantages namely, poor dispersion and suspensibility in water because of their larger size resulting in nozzle clogging in spray applications, posing a problem in delivery of nutrients to the plant or the crop. On other hand, powder formulations are very difficult to broadcast and cause high risk to human health due to dusting and engulfing of dust particle into human body due to inhalation, by the end user. Due to these drawbacks, such prior art pastille compositions containing manganese and sulphur have no commercially feasibility and zero applicability in drip or sprinkler irrigation systems which are becoming more essential on account of labour shortage and water turning into a scarce resource.

Furthermore, the other formulations disclosed in the art would direct a person to arrive at viscous liquids which are highly concentrated, resulting in issues in practical application. These highly concentrated formulations are difficult to be diluted in water. Such highly concentrated formulations do not form stable dispersions and tend to form a hard pack, thus rendering such compositions unsuitable for use. Such viscous, large particle size formulations being unpourable tend to clog the nozzles and pose a problem in the delivery of nutrients to the plant or the crop.

Thus no suitable composition comprising manganese in combination with fertilizer such as sulphur are known or available, which can be effectively used as a nutrient to meet the requirements of the plants or increased nutrient use efficiency or enhanced nutrient uptake and address the drawbacks discussed above with known compositions.

Hence, there is a need to develop a composition, which provides nutrients such as manganese and sulphur to the soil or the plants in a timely manner as per the physiological need of the plant. There is a further need to provide a composition which is readily dispersible and remains suspended in water, is user friendly, enhances yields, optimizes the uses of manganese and sulphur, while reducing the cost of application and is yet used in lower quantities, thus minimizing residue and overcomes the drawbacks presented by the prior art.

It was noted by the present inventors that the composition of the present invention is synergistic in nature and when formulated at a specific particle size, made both sulphur and manganese readily available for uptake by the plants and increase the overall yield. Further, it was observed that the selection of specific type of manganese salts in combination with elemental sulphur prevents leaching of manganese and makes it available to the fullest for the uptake by crops. Surprisingly, the inventors of the present application have determined that the crop nutrition or fortification composition of the present invention including one or more of manganese salts, complexes, derivatives or mixtures thereof and elemental sulphur, provides excellent results in terms of yield, plant growth, vitality, vigor and crop protection. The inventors have determined that the crop nutrition and fortification composition including effective amount of manganese salts, complexes, derivatives or mixtures thereof, effective amount of elemental sulphur and at least one agrochemically acceptable excipient with the composition having particle size in the range of 0.1 micron to 20 microns, demonstrates excellent field efficacy, for e.g. in the yields and growth of crops and improved plant physiological parameters such as increased rooting, improved foliage and increased greenness among others.

The composition of the present invention also surprisingly exhibits high nutrient use efficiency whereby plants take up higher amount of manganese and sulphur nutrients with an application of low dose of the composition as per the present invention. The composition of the present invention also surprisingly exhibits superior physical characteristics such as suspensibility, dispersibility, flowability, wettability, pourability and improved viscosity. The compositions of the present invention also demonstrated superior performance under accelerated storage and also surprisingly be used effectively in drip irrigation. Furthermore, the plants treated with the composition of the invention also exhibited improved disease resistance and showed a delayed pest attack or infestation. Moreover, the composition exhibited a surprisingly higher field efficacy at reduced dosages of application of the composition.

3. SUMMARY OF THE INVENTION

The inventors have determined that a water dispersible granular crop nutrition and fortification composition comprising effective amount of one or more of manganese salts, complexes, derivatives or mixtures thereof, elemental sulphur and at least one dispersing agent, exhibited a surprisingly higher yield in various crops, improved plant physiology and is readily used in micro irrigation systems. The water dispersible granules include one or more of manganese salts, complexes, derivatives or mixtures thereof in a concentration range of 0.1% to 70% by weight of the total composition, elemental sulphur in a concentration range of 1% to 90% by weight of the total composition and at least one dispersing agent. The dispersing agents are present in a concentration range of 1% to 30% by weight of the total composition. The water dispersible granular composition for crop nutrition and fortification further includes agrochemically acceptable excipients in the range of 1%-98.9% by weight of total composition. Further, the water dispersible granular crop nutrition and fortification composition is in the size range 0.1 mm-2.5 mm and comprises particles in the size range of 0.1 micron to 20 microns. According to an embodiment, water dispersible granular composition for crop nutrition and fortification is in the form of microgranules of the size range of 0.1 mm to 1.5 mm. According to an embodiment, water dispersible granular composition has almost no hardness. According to an embodiment, the manganese salts comprised in the water dispersible granular composition include water soluble salts or water insoluble salts.

Furthermore, the inventors of the application have also surprisingly found that a crop nutrition and a fortification composition in the form of a liquid suspension comprises one or more of manganese salts, complexes, derivatives or mixtures thereof; elemental sulphur; at least one agrochemically acceptable excipient and at least one structuring agent; demonstrated a high yield in certain crops and also finds a direct use in the micro irrigation systems.

According to an embodiment, the liquid suspension composition includes manganese salts, complexes, derivatives or mixtures thereof present in a concentration range of 0.1% to 55% by weight of the total composition. The liquid suspension composition includes elemental sulphur in the concentration range of 1% to 60% by weight of the total composition. The agrochemical excipients are present in a concentration range of 1% to 98.9% by weight of the composition. The liquid suspension composition includes agrochemically acceptable excipients such as surfactants. The surfactants are present in a concentration range of 0.1% to 50% by weight of the total composition and the structuring agents are present in a concentration range of 0.01% to 5% by weight of the total composition. The liquid suspension composition comprises particles in the size range of 0.1 micron to 20 microns. According to an embodiment, the manganese salts comprised in the liquid suspension include water soluble salts or water insoluble salts.

Furthermore, the invention relates to a process of preparing the crop nutrition and fortification composition comprising effective amounts of one or more of manganese salts, complexes, derivatives or mixtures thereof, elemental sulphur and at least one agrochemically acceptable excipient in the form of water dispersible granules and liquid suspension composition, where the compositions have a particle size in the range of 0.1 micron to 20 microns.

The invention also relates to a method of treating the plants, seeds, crops, plant propagation material, locus, parts thereof or the soil with the crop nutrition and a fortification composition comprising effective amount of one or more of manganese salts, complexes, derivatives or mixtures thereof, elemental sulphur and at least one agrochemically acceptable excipient.

The crop nutrition and fortification compositions can be applied as a foliar spray or to the soil, through broadcasting, bend/side placement, fertigation or through drip or trickle irrigation. The latter case of drip or trickle irrigation further optimizes farming practices, which are greatly challenged by an ever-increasing labour and water shortage. Thus, the compositions of the invention are used in all possible ways of application under varying agronomical practices, as per the convenience of the user.

According to an embodiment, the invention further relates to a method of improving the soil fertility, plant health, improving the crop nutrition, fortifying or strengthening the plant, protecting the plant, enhancing the plant yield or enhancing soil fertility or conditioning the soil, improving the disease and pest resistance of the crop; the method comprising treating at least one of seeds, seedlings, crops, plants, plant propagation materials, locus, parts thereof or to the surrounding soil with the crop nutrition and fortification composition of the present invention, comprising effective amounts of one or more of manganese salts, complexes, derivatives or mixtures thereof, elemental sulphur and at least one agrochemically acceptable excipient.

It is observed that the crop nutrition and fortification composition exhibited good physical and chemical properties, is readily dispersible, has enhanced suspensibility, is non-viscous, readily pourable, does not form a hard cake and enhanced stability even at extended storage under higher temperatures which in turn results in superior field performance.

4. DESCRIPTION OF THE DRAWINGS

For a more complete understanding of the invention, reference should now be made to the embodiments illustrated in greater detail in the accompanying The FIGURE and described by way of embodiments of the invention.

The FIGURE, in the form of a graphical representation illustrates observation on carbohydrate content in leaves assessed at 50 days of sowing of the soybean crop, by taking the samples from all the treated plots. The mean data is presented in the form of a graph, which enunciates the effect of different formulations of Sulphur(S)+Manganese dioxide (Mn) combination on the improvement in carbohydrate content in the soybean leaves. The graph demonstrates that the compositions as per the embodiments of the present invention exhibits synergistic effect over that of compositions known in the art, namely pellets/pastilles.

5. DESCRIPTION OF THE INVENTION

In describing the embodiment of the invention, specific terminology is chosen for the sake of clarity. However, it is not intended that the invention be limited to the specific terms so selected and it is to be understood that each specific term includes all technical equivalents that operate in a similar manner to accomplish a similar purpose. It is understood that any numerical range recited herein is intended to include all subranges subsumed. Also, unless denoted otherwise percentage of components in a composition are presented as weight percentage.

Water dispersible granules can be defined as a formulation consisting of granules to be applied after dispersion and suspension in water. As described herein, "WG" or "WDG" refers to water dispersible granules.

According to the invention, the term "liquid suspension" is defined as a stable suspension of a composition in a fluid such as water or a water miscible solvent, usually intended for dilution with water before use. Further the term or phrase "liquid suspension" also encompasses "aqueous dispersion" or "aqueous suspensions" or "suspension concentrate" or an SC composition or a "suspo-emulsion" composition.

Nutrient use efficiency (NUE) is defined as a measure of how well plants use the available mineral nutrients. Improvement of NUE is an essential pre-requisite for expansion of crop production into marginal lands with low nutrient availability but also a way to reduce use of inorganic fertilizer.

The invention relates to a composition for crop nutrition or fortification which includes effective amounts of one or more of manganese salts, complexes, derivatives or mixtures thereof; elemental sulphur and at least one agrochemically acceptable excipient, having particle size in the range of 0.1 micron to 20 microns, whereby the composition exhibits improved dispersibility and suspensibility. The manganese salts, complexes, derivatives or mixtures thereof are present in a concentration range of 0.1% to 70% w/w and elemental sulphur is present in a concentration range of 1% to 90% w/w. The composition has a particle size in the range of 0.1 micron to 20 microns, whereby the composition exhibits improved dispersibility and suspensibility.

According to an embodiment, the manganese salts include one or more of water insoluble salts and/or water soluble salts, complexes, derivatives or mixtures thereof.

According to an embodiment, the manganese salts, complexes or derivatives thereof particularly include one or more of water insoluble salts. According to an embodiment, the water insoluble salts include but are not limited to one or more of manganese oxide, trimanganese tetraoxide or mango-manganic oxide or Hausmannite; manganese hydroxide, manganese phosphate, manganese phosphate heptahydrate, carbonyl manganese, manganese dioxide, manganese diselenide, manganese tetroxide, manganese carbonate, manganese molybdate, manganese selenide, manganese telluride, manganese titanate, manganese nitride, manganese oxalate, manganese ferrocyanide, manganese fluoride, manganese borate, Manganese sulfide, potassium permanganate or permanganic acid; Dimanganese trioxide, their complexes, derivatives and mixtures thereof. Manganese oxide includes Manganese(II) oxide, MnO (Ferrite Grade); Manganese(II,III) oxide, $Mn_3O_4$; Manganese(III) oxide, $Mn_2O_3$; Manganese dioxide, (manganese(IV) oxide), $MnO_2$; Manganese(VI) oxide, $MnO_3$; and Manganese(VII) oxide, $Mn_2O_7$. Manganese hydroxide includes manganese dihydroxide and Manganous hydroxide. Manganese phosphate includes Manganese (II) Phosphate, Manganese diphosphate and Manganese phosphate tribasic. Manganese dioxide includes manganese(IV) oxide, manganese peroxide, manganese binoxide, manganese black, battery manganese, pyrolusite and manganese superoxide. However, those skilled in the art will appreciate that it is possible to utilize other water insoluble manganese salts without departing from the scope of the invention.

According to an embodiment, the preferred water insoluble salts of manganese include one or more of manganese oxide; manganese(II) oxide, MnO (Ferrite Grade); Manganese(II,III) oxide, $Mn_3O_4$; Manganese(III) oxide, $Mn_2O_3$; Manganese(VI) oxide, $MnO_3$; Manganese(VII) oxide, $Mn_2O_7$; manganese hydroxide; manganese phosphate; manganese dioxide; manganese carbonate; manganese oxalate; manganese borate and complexes, derivatives or mixtures thereof.

According to an embodiment, the manganese salts include one or more of water soluble salts. According to an embodiment, the water soluble salts include but are not limited to one or more of, manganese acetate, manganese diacetate, manganese gluconate, manganese succinate, manganese fumarate, potassium permanganate, manganese bromide, manganese chloride including manganese dichloride, manganese dichromate, dimanganese trioxide; manganese iodide, manganese nitrate, manganese sulfate, manganese sulfide, manganese chelate, manganese ammonium phosphate, manganese citrate, manganese bicarbonate, manganese zinc ferrite, manganese chlorate tetrahydrate, manganese fluorosilicate, sodium manganate and their complexes, derivatives and mixtures. Manganese chloride includes manganese dichloride, Manganese chloride and hyperchloride of manganese. Manganese sulphate includes Manganese(II) sulfate monohydrate, Manganese(II) sulfate and Manganese sulphate heptahydrate. However, those skilled in the art will appreciate that it is possible to utilize other water soluble manganese salts without departing from the scope of the invention.

According to another embodiment, the preferred water soluble salts include one or more of manganese acetate; manganese diacetate; manganese gluconate; manganese bromide; manganese chloride; manganese iodide; manganese nitrate; manganese citrate; manganese bicarbonate; manganese ammonium phosphate; manganese sulphate; and complexes, derivatives or mixtures thereof.

According to yet another embodiment, the manganese salts particularly include one or more of manganese oxide; manganese(II) oxide, MnO (Ferrite Grade); Manganese(II, III) oxide, $Mn_3O_4$; Manganese(III) oxide, $Mn_2O_3$; Manganese(VI) oxide, $MnO_3$; Manganese(VII) oxide, $Mn_2O_7$; manganese hydroxide; manganese phosphate; manganese dioxide; manganese carbonate; manganese oxalate; manganese borate; manganese acetate; manganese diacetate; manganese gluconate; manganese bromide; manganese chloride; manganese iodide; manganese nitrate; manganese citrate; manganese bicarbonate; manganese ammonium phosphate; manganese sulphate and complexes, derivatives or mixtures thereof.

According to a still further embodiment, manganese salts also include chelated forms such as manganese ethylenediamine tetraacetate, manganese diethylene triamine pentaacetic acid and manganese lignosulfonate.

According to an embodiment, the manganese salts, complexes, derivatives or mixtures thereof are present in the concentration range of 0.1% to 70% by weight of the total composition. According to an embodiment, the manganese salts, complexes, derivatives or mixtures thereof are present in the concentration range of 1% to 55% by weight of the total composition. According to an embodiment, manganese salts, complexes, derivatives or mixtures thereof are present in the concentration range of 1% to 45% by weight of the total composition. According to an embodiment, the manganese salts, complexes, derivatives or mixtures thereof are present in the concentration range of 1% to 25% by weight of the total composition. According to an embodiment, the manganese salts, complexes, derivatives or mixtures thereof are present in the concentration range of 1% to 10% by weight of the total composition.

According to an embodiment, the elemental sulphur is present in an amount of 1% to 90% by weight of the crop nutrition and fortification composition. According to an embodiment, the elemental sulphur is present in an amount of 1% to 80% by weight of the crop nutrition and fortification composition. According to an embodiment, the elemental sulphur is present in an amount of 1% to 65% by weight of the crop nutrition and fortification composition. According to an embodiment, the elemental sulphur is present in an amount of 1% to 50% by weight of the crop nutrition and fortification composition. According to an embodiment, the elemental sulphur is present in an amount of 1% to 35% by weight of the crop nutrition and fortification composition. According to an embodiment, the elemental sulphur is present in an amount of 1% to 20% by weight of the crop nutrition and fortification composition.

According to an embodiment, the elemental sulphur is present in an amount of 20% to 90% by weight of the crop nutrition and fortification composition. According to an embodiment, the elemental sulphur is present in an amount of 20% to 40% by weight of the crop nutrition and fortification composition.

According to an embodiment, the average particle size of the crop nutrition and fortification composition is in the range of 0.1 micron to 20 microns. According to another embodiment, the average particle size of the crop nutrition and fortification composition is in the range of 0.1 micron to 15 microns. According to an embodiment, the average particle size of the crop nutrition and fortification composition is in the range of 0.1 micron to 10 microns.

According to an embodiment, the weight ratio of one or more of manganese salts, complexes, derivatives or mixtures to elemental sulphur is 1:900 to 70:1. According to an embodiment, the weight ratio of one or more of manganese salts, complexes, derivatives or mixtures to elemental sulphur is 1:90 to 70:1. According to an embodiment, the weight ratio of one or more of manganese salts, complexes, derivatives or mixtures to elemental sulphur is 1:10 to 10:1. According to an embodiment, the weight ratio of one or more of manganese salts, complexes, derivatives or mixtures to elemental sulphur is 1:1 to 10:1. According to an embodiment, the weight ratio of one or more of manganese salts, complexes, derivatives or mixtures to elemental sulphur is 1:1 to 5:1. According to an embodiment, the weight ratio of one or more of manganese salts, complexes, derivatives or mixtures to elemental sulphur is 1:1 to 2:1.

According to an embodiment, the crop nutrition and fortification composition is in a solid form or a liquid form. For e.g., the crop nutrition and fortification composition is in the form of wettable powders, liquid suspensions, aqueous suspensions, suspension concentrates, suspo-emulsions, water dispersible granules, seed dressings or seed treatment compositions, and combinations thereof.

According to an embodiment, the crop nutrition and fortification composition is in the form of water dispersible granules. According to an embodiment, the crop nutrition and fortification composition in the form of water dispersible granules includes one or more of manganese salts, complexes or derivatives thereof in the concentration range of 0.1% to 70% by weight of the total composition, elemental sulphur in the concentration range of 1% to 90% by weight of the total composition and at least one dispersing agent in the concentration range of 1% to 30% by weight. The water dispersible granules are in a size range of 0.1 mm to 2.5 mm and the composition has a particle size in the range of 0.1 micron to 20 microns. The crop nutrition and fortification composition in the form of water dispersible granules further includes at least one agrochemical excipient.

According to an embodiment, the crop nutrition and fortification composition in the form of water dispersible granules particularly include one or more of manganese salts, complexes or derivatives thereof in the range of 0.1% to 70% by weight of the total composition, elemental sulphur in the range of 20% to 90% by weight of the total composition and at least one dispersing agent in the range of 0.1% to 30% by weight of the total composition.

According to an embodiment, the crop nutrition and fortification composition in the form of water dispersible granules comprises one or more of water soluble manganese salts or water insoluble manganese salts.

According to an embodiment, the crop nutrition and fortification composition in the form of water dispersible granules particularly includes one or more of water insoluble manganese salts, complexes or derivatives thereof in the range of 0.1% to 70% by weight of the total composition, elemental sulphur in the range of 1% to 90% by weight of the total composition and at least one dispersing agent in the concentration range of 1% to 30% by weight, wherein the composition has a particle size in the range of 0.1 micron to 20 microns. The water dispersible granules are in a size range of 0.1 mm to 2.5 mm.

According to an embodiment, the crop nutrition and fortification composition in the form of water dispersible granules particularly includes one or more of manganese oxide; manganese(II) oxide, MnO (Ferrite Grade); Manganese(II,III) oxide, $Mn_3O_4$; Manganese(III) oxide, $Mn_2O_3$; Manganese(VI) oxide, $MnO_3$; Manganese(VII) oxide, $Mn_2O_7$; manganese hydroxide; manganese phosphate; manganese dioxide; manganese carbonate; manganese oxalate; manganese borate their complexes, derivatives or mixtures thereof, in the range of 0.1% to 70% by weight of the total composition, elemental sulphur in the range of 1% to 90% by weight of the total composition and at least one dispersing agent, wherein the composition has a particle size in the range of 0.1 micron to 20 microns. The water dispersible granules are in a size range of 0.1 mm to 2.5 mm.

According to an embodiment, the crop nutrition and fortification composition in the form of water dispersible granules includes one or more of water soluble manganese salts, complexes or derivatives thereof in the range of 0.1% to 70% by weight of the total composition, elemental sulphur in the range of 1% to 90% by weight of the total composition and at least one dispersing agent in the concentration range of 1% to 30% by weight, wherein the composition has a particle size in the range of 0.1 micron to 20 microns. The water dispersible granules are in a size range of 0.1 mm to 2.5 mm.

According to an embodiment, the crop nutrition and fortification composition in the form of water dispersible granules particularly includes one or more of manganese acetate; manganese diacetate; manganese gluconate; manganese bromide; manganese chloride; manganese dichloride; manganous chloride; hyperchloride of manganese; manganese iodide; manganese nitrate; manganese citrate; manganese bicarbonate; manganese ammonium phosphate; manganese sulphate; manganese(II) sulfate monohydrate; manganese(II) sulfate; manganese sulphate heptahydrate; their salts, complexes, derivatives and mixtures thereof in the range of 0.1% to 70% by weight of the total composition, elemental sulphur in the range of 1% to 90% by weight of the total composition and at least one dispersing agent in the concentration range of 1% to 30% by weight, wherein the composition has a particle size in the range of 0.1 micron to 20 microns. The water dispersible granules are in a size range of 0.1 mm to 2.5 mm.

According to an embodiment, manganese sulphate is present in a concentration range of 0.1% to 70% by weight, preferably in concentration of more than 25% by weight and more preferably in a concentration range of 26% to 70% by weight According to an embodiment, the crop nutrition and fortification composition in the form of water dispersible granules particularly includes one or more of manganese oxide; manganese(II) oxide, MnO (Ferrite Grade); Manganese(II,III) oxide, $Mn_3O_4$; Manganese(III) oxide, $Mn_2O_3$; Manganese(VI) oxide, $MnO_3$; Manganese(VII) oxide, $Mn_2O_7$; manganese hydroxide; manganese phosphate; manganese dioxide; manganese carbonate; manganese oxalate; manganese borate; manganese acetate; manganese diacetate; manganese gluconate; manganese bromide; manganese chloride; manganese iodide; manganese nitrate; manganese citrate; manganese bicarbonate; manganese ammonium phosphate; manganese sulphate their salts, complexes, derivatives and mixtures thereof in the range of 0.1% to 70% by weight of the total composition, elemental sulphur in the range of 1% to 90% by weight of the total composition and at least one dispersing agent, wherein the composition has a particle size in the range of 0.1 micron to 20 microns.

According to an embodiment, the weight ratio of one or more of manganese salts, complexes, derivatives or mixtures to elemental sulphur in the form of water dispersible granules is 1:900 to 70:1. According to an embodiment, the weight ratio of one or more of manganese salts, complexes, derivatives or mixtures to elemental sulphur in the form of water dispersible granules is 1:90 to 70:1. According to an embodiment, the weight ratio of one or more of manganese salts, complexes, derivatives or mixtures to elemental sulphur in the form of water dispersible granules is 1:90 to 3.5:1. According to an embodiment, the weight ratio of one or more of manganese salts, complexes, derivatives or mixtures to elemental sulphur in the form of water dispersible granules is 1:10 to 10:1. According to an embodiment, the weight ratio of one or more of manganese salts, complexes, derivatives or mixtures to elemental sulphur in the form of water dispersible granules is 1:1 to 10:1. According to an embodiment, the weight ratio of one or more of manganese salts, complexes, derivatives or mixtures to elemental sulphur in the form of water dispersible granules is 1:1 to 5:1. According to an embodiment, the weight ratio of one or more of manganese salts, complexes, derivatives or mixtures to elemental sulphur in the form of water dispersible granules 1:1 to 2:1.

According to an embodiment, the crop nutrition and fortification composition is in the form of water dispersible granules, wherein the granules are in the size range of 0.1 to 2.5 mm. Preferably, according to an embodiment, the crop nutrition and fortification composition in the form of water dispersible granules have granule size in the range of 0.1 to 2 mm. Preferably, according to an embodiment, the crop nutrition and fortification composition in the form of water dispersible granules have granule size in the range of 0.1 to 1.5 mm. Preferably, the crop nutrition and fortification composition in the form of water dispersible granules have granule size in the range of 0.1 to 1 mm. Most preferably, the crop nutrition and fortification composition in the form of water dispersible granules have granule size in the range of 0.1 to 0.5 mm.

According to an embodiment, the water dispersible granules are in the form of microgranules, wherein the granules are in the size range of 0.1 mm to 1.5 mm. The granule comprises particles in the size range of 0.1 to 20 microns.

According to an embodiment, the crop nutrition and fortification composition is in the form of a liquid suspension.

According to an embodiment, the crop nutrition and fortification composition is in the form of a liquid suspension comprises 0.1% to 55% by weight of one or more of manganese salts, complexes, derivatives or mixtures thereof and 1% to 60% by weight of elemental sulphur; at least one structuring agent in the range of 0.01% to 5% by weight of the total composition and at least one agrochemically acceptable excipients, wherein the composition has a particle size in the range of 0.1 micron to 20 microns.

According to an embodiment, the liquid suspension comprises 0.1% to 55% by weight of the one or more of manganese, salts, complexes, derivatives or mixtures thereof. According to an embodiment, the liquid suspension comprises 0.1% to 45% by weight of the one or more of manganese salts, complexes, derivatives or mixtures thereof. According to an embodiment, the liquid suspension comprises 0.1% to 25% by weight of the one or more of manganese salts, complexes, derivatives or mixtures thereof. According to an embodiment, the liquid suspension comprises 0.1% to 10% by weight of the one or more of manganese salts, complexes, derivatives or mixtures thereof.

According to an embodiment, the crop nutrition and fortification composition in the form of a liquid suspension comprises 1% to 60% by weight of elemental sulphur. According to an embodiment, the crop nutrition and fortification composition in the form of a liquid suspension comprises 1% to 45% by weight of elemental sulphur. According to an embodiment, the liquid suspension comprises 1% to 35% by weight of elemental sulphur. According to an embodiment, the liquid suspension comprises 1% to 20% by weight of elemental sulphur.

According to an embodiment, the crop nutrition and fortification composition is in the form of a liquid suspension comprises one or more of water soluble manganese salts or water insoluble manganese salts.

According to an embodiment, the crop nutrition and fortification composition in the form of a liquid suspension particularly comprises 0.1% to 55% by weight of one or more water insoluble manganese salts, complexes or derivatives thereof, elemental sulphur in the range of 1% to 60% by weight of the total composition; at least one agrochemical excipient and at least one structuring agent in the range of 0.01% to 5% by weight of the total composition, wherein the composition has a particle size in the range of 0.1 micron to 20 microns.

According to an embodiment, the crop nutrition and fortification composition in the form of a liquid suspension particularly comprises 0.1% to 55% by weight of one or more of manganese oxide; manganese(II) oxide, MnO (Ferrite Grade); Manganese(II,III) oxide, $Mn_3O_4$; Manganese(III) oxide, $Mn_2O_3$; Manganese(VI) oxide, $MnO_3$; Manganese(VII) oxide, $Mn_2O_7$; manganese hydroxide; manganese phosphate; manganese diphosphate; manganese phosphate tribasic; manganese dioxide; (manganese (IV) oxide), $MnO_2$; manganese(III) oxide $Mn_2O_3$; manganese(VI) oxide $MnO_3$; and manganese(VII) oxide $Mn_2O_7$; manganese carbonate; manganese borate; manganese oxalate; their complexes, derivatives and mixtures thereof; elemental sulphur in the range of 1% to 60% by weight of the total composition; at least one agrochemical excipient; and at least one structuring agent in the range of 0.01% to 5% by weight of the total composition, wherein the composition has a particle size in the range of 0.1 micron to 20 microns.

According to an embodiment, the crop nutrition and fortification composition in the form of a liquid suspension comprises 0.1% to 55% by weight of the total composition of one or more of water soluble manganese salts, complexes or derivatives thereof, elemental sulphur in the range of 1% to 60% by weight of the total composition, at least one agrochemical excipient; and at least one structuring agent in the range of 0.01% to 5% by weight of the total composition, wherein the composition has a particle size in the range of 0.1 micron to 20 microns.

According to an embodiment, the crop nutrition and fortification composition in the form of a liquid suspension particularly comprises 0.1% to 55% by weight of one or more of manganese acetate; manganese diacetate; manganese gluconate; manganese bromide; manganese chloride; manganese dichloride; manganous chloride; hyperchloride of manganese; manganese iodide; manganese nitrate; manganese citrate; manganese bicarbonate; manganese ammonium phosphate; manganese sulphate; manganese(II) sulfate monohydrate; manganese(II) sulfate; manganese sulphate heptahydrate; and complexes, derivatives or mixtures thereof; elemental sulphur in the range of 1% to 60% by weight of the total composition; at least one agrochemical excipient; and, at least one structuring agent in the range of 0.01% to 5% by weight of the total composition, wherein the composition has a particle size in the range of 0.1 micron to 20 microns.

According to an embodiment, the crop nutrition and fortification composition in the form of a liquid suspension particularly comprises 0.1% to 55% by weight of one or more of include one or more of manganese oxide; manganese(II) oxide, MnO (Ferrite Grade); Manganese(II,III) oxide, $Mn_3O_4$; Manganese(III) oxide, $Mn_2O_3$; Manganese (VI) oxide, $MnO_3$; Manganese(VII) oxide, $Mn_2O_7$; manganese hydroxide; manganese phosphate; manganese dioxide; manganese carbonate; manganese oxalate; manganese borate; manganese acetate; manganese diacetate; manganese gluconate; manganese bromide; manganese chloride; manganese iodide; manganese nitrate; manganese citrate; manganese bicarbonate; manganese ammonium phosphate; manganese sulphate and complexes, derivatives or mixtures thereof; elemental sulphur in the range of 1% to 60% by weight of the total composition; at least one agrochemical excipient; and, at least one structuring agent in the range of 0.01% to 5% by weight of the total composition, wherein the composition has a particle size in the range of 0.1 micron to 20 microns.

According to an embodiment, the weight ratio of one or more of manganese salts, in complexes, derivatives or mixtures thereof to elemental sulphur in a liquid suspension is 1:600 to 55:1. According to an embodiment, the weight ratio of one or more of manganese salts, in complexes, derivatives or mixtures thereof to elemental sulphur in a liquid suspension is 1:50 to 35:1. According to an embodiment, the weight ratio of one or more of manganese salts, complexes, derivatives or mixtures to elemental sulphur in a liquid suspension is 1:10 to 10:1. According to an embodiment, the weight ratio of one or more of manganese salts, complexes, derivatives or mixtures to elemental sulphur in a liquid suspension is 1:2.5 to 1.5:1. According to an embodiment, the weight ratio of one or more of manganese salts, complexes, derivatives or mixtures to elemental sulphur in a liquid suspension is 1:1.

According to an embodiment, the structuring agent which is used in the crop nutrition and fortification composition includes one or more of thickeners, viscosity modifiers, tackifiers, suspension aids, rheological modifiers or anti-settling agents. A structuring agent prevents sedimentation of the active ingredient particles after prolonged storage.

According to an embodiment, the structuring agents which are used in the liquid suspension composition include, but not limited to one or more polymers such as polyacrylics, polyacrylamides, polysaccharides, hydrophobically modified cellulose derivatives, co-polymers of cellulose derivatives, carboxyvinyl or polyvinyl pyrrolidones, polyethylenes, polyethylene oxide, polyvinyl alcohol and derivatives; clays such as bentonite clays, kaolin, smectite, attapulgites, attaclays with high surface area silica and natural gums such as guar gum, xanthan gum, gum Arabic, gum tragacanth, rhamsan gum, locust bean gum, carageenan, welan gum, veegum, gelatin, dextrin, collagen; polyacrylic acids and their sodium salts; the polyglycol ethers of fatty alcohols and polyethylene oxide or polypropylene oxide condensation products and mixtures thereof and include ethoxylated alkyl phenols (also designated in the art as alkylaryl polyether alcohols); ethoxylated aliphatic alcohols (or alkyl polyether alcohols); ethoxylated fatty acids (or polyoxyethylene fatty acid esters); ethoxylatedanhydrosorbitol esters (or polyethylene sorbitan fatty acid esters), long chain amine and cyclic amine oxides which are nonionic in basic solutions; long chain tertiary phosphine oxides; and long chain dialkyl sulfoxides, fumed silica, mixture of fumed silica and fumed aluminium oxide, swellable polymers, polyamides or its derivatives; polyols such as glycerine, poly(vinyl acetate), sodium polyacrylate, poly(ethylene glycol), phospholipid (for example, cephalin, and the like); stachyose, fructo-oligosaccharides, amylose, pectins, alginates, hydrocolloids and mixtures thereof. Also, celluloses such as hemicellulose, carboxymethylcellulose, ethylcellulose, hydroxyethylcellulose, hydroxy-methyl ethyl cellulose, hydroxyl ethyl propyl cellulose, methylhydroxyethylcellulose, methylcellulose; starches such as starch acetates, starch hydroxyethyl ethers, ionic starches, long-chain alkyl starches, corn starch, amine starches, phosphates starches, and dialdehyde starches; plant starches such as corn starch and potato starch; other carbohydrates such as pectin, amylopectin, glycogen, agar, gluten, alginic acid, phycocolloids, or derivatives thereof. However, those skilled in the art will appreciate that it is possible to utilize other conventionally known structuring agents without departing from the scope of the present invention.

Preferred structuring agents include one or more of xanthan gum, aluminum silicate, methylcellulose, carboxymethylcellulose, polysaccharide, alkaline earth metal silicate, gelatin, and polyvinyl alcohol. The structuring agents are commercially manufactured and available through various companies.

According to an embodiment, the structuring agent is present in an amount of 0.01% to 5% w/w of the composition. According to an embodiment, the structuring agent is present in an amount of 0.01% to 4% w/w of the composition. According to an embodiment, the structuring agent is present in an amount of 0.01% to 3% w/w of the composition. According to an embodiment, the structuring agent is present in an amount of 0.01% to 2% w/w of the composition. According to an embodiment, the structuring agent is present in an amount of 0.01% to 1% w/w of the composition. According to an embodiment, the structuring agent is present in an amount of 0.01% to 0.1% w/w of the composition.

According to an embodiment, the crop nutrition and fortification composition in the form of liquid suspension and water dispersible granules comprise particles in the size range of 0.1 microns to 20 microns, preferably, particles in the size range of 0.1 micron to 15 microns and most preferably in the range of 0.1 to 10 microns. Better uptake of manganese and sulphur is made available to the crops at a particle size range of about 0.1-20 microns. Thus, the particle size of 0.1-20 microns of the crop nutrition and fortification composition was found to be important not only in terms of ease of application but also in terms of efficacy.

According to an embodiment, the crop nutrition and fortification composition further optionally comprise at least one additional active ingredient which includes one or more of fertilizers, micronutrients, macronutrients, vitamins, microbes, bacteriospores, one or more pesticidal actives, humic acid, hydrogels, superabsorbents and biostimulants. The microbes, bacteriospores and biostimulants are commercially developed, manufactured and available through various suppliers around the world.

According to an embodiment, the additional active ingredients are present in an amount of 1% to 90% by weight of the crop nutrition and fortification composition. According to an embodiment, the additional active ingredients are present in an amount of 1% to 60% by weight of the crop nutrition and fortification composition. According to an embodiment, the additional active ingredients are present in an amount of 1% to 40% by weight of the crop nutrition and fortification composition. According to an embodiment, the additional active ingredients are present in an amount of 1% to 20% by weight of the crop nutrition and fortification composition.

According to an embodiment, the crop nutrition and fortification composition may optionally comprise at least one fertilizer. Fertilizers are simply crop nutrients applied to agricultural fields to supplement required elements found naturally in the soil. The soil tends to lose its fertility due to continuous nutrient uptake by crops, run off losses with water, leaching, volatilization of nutrients and erosion of soil as a result of which the requirement of the crop is not met. Application of fertilizers not only assist in increasing yield and promoting healthy crop but also helps in development of defense against the pest and disease attack. Thus, application of optimum amount and type of fertilizer to the crops is crucial in meeting the nutrient requirement of the crop.

According to an embodiment, the fertilizers include single nutrient fertilizers, multinutrient fertilizers, binary fertilizers, compound fertilizers, organic fertilizers or mixtures thereof. According to an embodiment, the fertilizers which are included optionally in the crop nutrition and fortification composition comprise one or more of water soluble fertilizers or water insoluble fertilizers, or salts or complexes or derivatives, or mixtures thereof. However, those skilled in the art will appreciate that it is possible to utilize other fertilizers known in the art, without departing from the scope of the invention.

According to further embodiment, the fertilizers comprise one or more of nitrogen fertilizers, phosphate fertilizers, potash fertilizers, ammonium nitrate, urea, sodium nitrate, potassium fertilizers such as potassium chloride, potassium sulfate, potassium carbonate, potassium nitrate, monoammonium phosphate, diammonium phosphate, calcium ammonium nitrate, super phosphates, phosphogypsum, triple super phosphates, NPK fertilizers or their salts, complexes, derivatives, or mixtures thereof. However, those skilled in the art will appreciate that it is possible to use other fertilizers without departing from the scope of the present invention. The fertilizers are commercially manufactured and available through various companies.

According to an embodiment, the fertilizers are present in an amount of 1% to 90% by weight of the crop nutrition and fortification composition. According to an embodiment, the fertilizers are present in an amount of 1% to 40% by weight of the crop nutrition and fortification composition. According to an embodiment, the -fertilizers are present in an amount of 1% to 20% by weight of the crop nutrition and fortification composition.

According to an embodiment, the crop nutrition and fortification composition may comprise at least one micronutrient. According to another embodiment, the micronutrients comprise one or more of zinc, calcium, boron, magnesium, copper, iron, silicon, cobalt, chlorine, sodium, molybdenum, chromium, vanadium, selenium, nickel, iodine, fluorine, phosphorous, potassium, in their elemental form, or salts, complexes, derivatives or mixtures thereof. The micronutrients also comprise one or more of vitamins, organic acids or salts, complexes or derivatives or mixtures thereof. However, the above list of optional micronutrients is exemplary and not meant to limit the scope of the invention. Those skilled in the art will appreciate that it is possible to use other micronutrients without departing from the scope of the present invention. The micronutrients are commercially manufactured and available through various companies.

According to an embodiment, the micronutrients are present in an amount of 0.1% to 70% w/w of the composition. According to further embodiment, the micronutrients are present in an amount of 0.1% to 60% w/w of the composition. According to a further embodiment, the micronutrients are present in an amount of 0.1% to 40% w/w of the composition.

According to an embodiment, the composition may further include biostimulants selected from one or more of, but not limited to, enzymes, humic acid and fulvic acid. The biostimulants used, are commercially manufactured and sourced from various commercial manufacturers around the world. However, those skilled in the art will appreciate that it is possible to utilize different biostimulants without departing from the scope of the present invention.

According to an embodiment, the pesticidal actives include an antifoulant, an insecticide, a fungicide, a herbicide, a nematicide, a pheromone, a defoliant, an acaricide, a plant growth regulator, an algicide, an antifeedant, an avicide, a bactericide, a bird repellent, a biopesticide, a biocide, a chemosterilant, a safener, an insect attractant, an insect repellent, a insect growth regulator, a mammal repellent, a mating disrupter, a disinfectant, a molluscicide, a antimicrobial, a miticide, an ovicide, a fumigant, a plant activator, a rodenticide thereof, a synergist, a virucide, a microbial pesticide, a plant incorporated protectant, other miscellaneous pesticidal actives, or salts, derivatives and mixtures According to an embodiment, the pesticides are present in an amount of 0.1% to 70% w/w of the total composition. According to further embodiment, the pesticides are present in the amount of 0.1% to 60% w/w of the total composition. According to further embodiment, the optional pesticides are present in the amount of 0.1% to 40% w/w of the total composition.

According to an embodiment, the crop nutrition and fortification composition include agrochemically acceptable excipients such as surfactants, dispersing agents, wetting agents, binders or binding agents, disintegrating agents, fillers or carriers or diluents, emulsifiers, spreading agents, coating agents buffers or pH adjusters or neutralizing agents, antifoaming agents or defoamers, penetrants, preservatives, ultraviolet absorbents, UV ray scattering agents, stabilizers, pigments, colorants, structuring agents, chelating or complexing or sequestering agents, suspending agents or suspension aid agents, humectants, sticking agents, antifreezing agent or freeze point depressants, water miscible solvents and mixtures thereof. However, those skilled in the art will appreciate that it is possible to utilize additional agrochemically acceptable excipients without departing from the scope of the present invention. The agrochemically acceptable excipients are commercially manufactured and available through various companies.

According to an embodiment, the crop nutrition and fortification composition in the form of water dispersible granules further include one or more agrochemically acceptable excipients. These agrochemically acceptable excipients include one or more of disintegrating agents; wetting agents, binders; fillers; carriers or diluents; buffers or pH adjusters or neutralizing agents; antifoaming agents; drift reducing agents; anticaking agents; spreading agents; penetrating agents; and sticking agents. However, those skilled in the art will appreciate that it is possible to utilize additional agrochemically acceptable excipients, without departing from the scope of the present invention.

According to an embodiment, the crop nutrition and fortification composition in the form of liquid suspension includes one or more agrochemically acceptable excipients. According to an embodiment, the agrochemically acceptable excipients comprise one or more surfactants. According to an embodiment, the agrochemically acceptable excipients in the liquid suspension composition further comprise one or more of dispersing agents, humectants, spreading agents, suspending agents or suspension aid, penetrating agents, sticking agents, drift reducing agents, ultraviolet absorbents, UV ray scattering agents, preservatives, stabilizers, buffers or pH adjusters or neutralizing agents, antifreezing agents or freeze point depressants, antifoaming agents, and anticaking agents. However, those skilled in the art will appreciate that it is possible to utilize additional agrochemically acceptable excipients, without departing from the scope of the present invention.

According to an embodiment, the agrochemical excipients are present in a concentration range of 1% to 98.9% by weight of the total composition. According to an embodiment, the agrochemical excipients are present in a concentration range of at least 98% by weight of the total composition. According to an embodiment, the agrochemical excipients are present in a concentration range of at least 95% by weight of the total composition. According to an embodiment, the agrochemical excipients are present in a concentration range of at least 80% by weight of the total composition. According to an embodiment, the agrochemical excipients are present in a concentration range of at least 60% by weight of the total composition. According to an embodiment, the agrochemical excipients are present in a concentration range of at least 40% by weight of the total composition. According to an embodiment, the agrochemical excipients are present in a concentration range of at least 20% by weight of the total composition. According to an embodiment, the agrochemical excipients are present in a concentration range of at least 10% by weight of the total composition. According to an embodiment, the agrochemical excipients are present in a concentration range of at least 5% by weight of the total composition. According to an embodiment, the agrochemical excipients are present in a concentration range of at least 1% by weight of the total composition.

According to an embodiment, the surfactants which are used in the crop nutrition and fortification composition include one or more of anionic, cationic, non-ionic, amphoteric and polymeric surfactants. According to an embodiment, the surfactants include one or more of emulsifiers, wetting agents and dispersing agents.

The anionic surfactants include one or more of, but not limited to a salt of fatty acid, a benzoate, a polycarboxylate, a salt of alkylsulfuric acid ester, alkyl ether sulfates, an alkyl sulfate, an alkylaryl sulfate, an alkyl diglycol ether sulfate, a salt of alcohol sulfuric acid ester, an alkyl sulfonate, an alkylaryl sulfonate, an aryl sulfonate, a lignin sulfonate, an alkyldiphenyletherdisulfonate, a polystyrene sulfonate, a salt of alkylphosphoric acid ester, an alkylaryl phosphate, a styrylaryl phosphate, sulfonate docusates, a salt of polyoxyethylene alkyl ether sulfuric acid ester, a polyoxyethylenealkylaryl ether sulfate, alkyl sarcosinates, alpha olefin sulfonate sodium salt, alkyl benzene sulfonate or its salts, sodium lauroylsarcosinate, Sulfosuccinates, polyacrylates, polyacrylates—free acid and sodium salt, salt of polyoxyethylenealkylaryl ether sulfuric acid ester, a polyoxyethylene alkyl ether phosphate, a salt of polyoxyethylenealkylaryl phosphoric acid ester, sulfosuccinates—mono and other diesters, phosphate esters, alkyl naphthalene sulfonate-isopropyl and butyl derivatives, alkyl ether sulfates—sodium and ammonium salts; alkyl aryl ether phosphates, ethylene oxides and its derivatives, a salt of polyoxyethylene aryl ether phosphoric acid ester, mono-alkyl sulphosuccinates, aromatic hydrocarbon sulphonates, 2-acrylamido-2-methyl-propane sulfonic acid, ammonium lauryl sulfate, ammonium perfluorononanoate, Docusate, Disodium cocoamphodiacetate, Magnesium laureth sulfate, Perfluorobutanesulfonic acid, Perfluorononanoic acid, carboxylates, Perfluoro-octanesulfonic acid, Perfluorooctanoic acid, Phospholipid, Potassium lauryl sulfate, Soap, Soap substitute, Sodium alkyl sulfate, Sodium dodecyl sulfate, Sodium dodecylbenzenesulfonate, Sodium laurate, Sodium laureth sulfate, Sodium lauroylsarcosinate, Sodium myreth sulfate, Sodium nonanoyloxybenzenesulfonate, Sodium pareth sulfate, alkyl carboxylates, Sodium stearate, alpha olefin sulphonates, Sulfolipid, naphthalene sulfonate salts, alkyl naphthalene sulfonate fatty acid salts, naphthalene sulfonate condensates—sodium salt, fluoro carboxylate, fatty alcohol sulphates, alkyl naphthalene sulfonate condensates—sodium salt, a naphthalene sulfonic acid condensed with formaldehyde or a salt of alkylnaphthalene sulfonic acid condensed with formaldehyde; or salts, derivatives thereof. However, those skilled in the art will appreciate that it is possible to utilize other anionic surfactants, without departing from the scope of the present invention.

Cationic surfactants include one or more of, but not limited to Dialkyl dimethyl ammonium chlorides, Alkyl methyl ethoxylated ammonium chlorides or salts, Dodecyl-, Coco-, Hexadecyl-, Octadecyl-, Octadecyl/Behenyl-, Behenyl-, Cocoamidopropyl-, Trimethyl Ammonium Chloride; Coco-, Stearyl-, bis(2-hydroxyethyl)Methyl Ammonium Chloride, Benzalkonium Chloride, Alkyl-, Tetradecyl-, Octadecyl-Dimethyl Benzyl Ammonium Chloride, Dioctyl-, Di(Octyl-Decyl)-, Didecyl-, Dihexadecyl-Distearyl-, Di(Hydrogenated Tallow)-Dimethyl Ammonium Chloride, Di(Hydrogenated Tallow) Benzyl-, Trioctyl-, Tri(Octyl-Decyl)-, Tridodecyl-, Trihexadecyl-Methyl Ammonium Chloride, Dodecyl Trimethyl-, Dodecyl Dimethyl Benzyl-, Di-(Octyl-Decyl) Dimethyl, Didecyl Dimethyl-Ammonium Bromide, quaternised amine ethoxylates, Behentrimonium chloride, Benzalkonium chloride, Benzethonium chloride, Benzododecinium bromide, Bronidox, quaternary ammonium salts Carbethopendecinium bromide, Cetalkonium chloride, Cetrimonium bromide, Cetrimonium chloride, Cetylpyridinium chloride, Didecyldimethylammonium chloride, Dimethyldioctadecylammonium bromide, Dimethyldioctadecylammonium chloride, Domiphen bromide, Lauryl methyl gluceth-10 hydroxypropyldimonium chloride, Octenidinedihydrochloride, Olaflur, N-Oleyl-1, 3-propanediamine, Pahutoxin, Stearalkonium chloride, Tetramethylammonium hydroxide, Thonzonium bromide; salts or derivatives thereof. However, those skilled in the art will appreciate that it is possible to utilize other cationic surfactants, without departing from the scope of the present invention.

The non-ionic surfactants include one or more of but are not limited to polyol esters, polyol fatty acid esters, polyethoxylated esters, polyethoxylated alcohols, ethoxylated and propoxylated fatty alcohols, ethoxylated and propoxylated alcohols, EO/PO copolymers; EO and PO block copolymers, di, tri-block copolymers; block copolymers of polyethylene glycol and polypropylene glycol, poloxamers, polysorbates, alkyl polysaccharides such as alkyl polyglycosides and blends thereof, amine ethoxylates, sorbitan fatty acid ester, glycol and glycerol esters, glucosidyl alkyl ethers, sodium tallowate, polyoxyethylene glycol, sorbitan alkyl esters, sorbitan derivatives, fatty acid esters of sorbitan (Spans) and their ethoxylated derivatives (Tweens), and sucrose esters of fatty acids, Cetostearyl alcohol, Cetyl alcohol, Cocamide DEA, Cocamide MEA, Decyl glucoside, Decylpolyglucose, Glycerol monostearate, Lauryl glucoside, Maltosides, Monolaurin, Narrow-range ethoxylate, Nonidet P-40, Nonoxynol-9, Nonoxynols, Octaethylene glycol monododecyl ether, N-Octyl beta-D-thioglucopyranoside, Octyl glucoside, Oleyl alcohol, PEG-10 sunflower glycerides, Pentaethylene glycol monododecyl ether, Polidocanol, Poloxamer, Poloxamer 407, Polyethoxylated tallow amine, Polyglycerol polyricinoleate, Polysorbate, Polysorbate 20, Polysorbate 80, Sorbitan, Sorbitan monolaurate, Sorbitanmonostearate, Sorbitantristearate, Stearyl alcohol, Surfactin, glyceryl laureate, lauryl glucoside, nonylphenolpolyethoxyethanols, nonyl phenol polyglycol ether, castor oil ethoxylate, polyglycol ethers, polyadducts of ethylene oxide and propylene oxide, block copolymer of polyalkylene glycol ether and hydroxystearic acid, tributylphenoxypolyethoxy ethanol, octylphenoxypolyethoxy ethanol, etho-propoxylatedtristyrlphenols, ethoxylated alcohols, polyoxy ethylene sorbitan, fatty acid polyglyceride, a fatty acid alcohol polyglycol ether, acetylene glycol, acetylene alcohol, an oxyalkylene block polymer, a polyoxyethylene alkyl ether, a polyoxyethylenealkylaryl ether, a polyoxyethylenestyrylaryl ether, a polyoxyethylene glycol alkyl ether, polyethylene glycol, a polyoxyethylene fatty acid ester, a polyoxyethylenesorbitan fatty acid ester, a polyoxyethylene glycerin fatty acid ester, Alcohol ethoxylates—C6 to C16/18 alcohols, linear and branched, Alcohol alkoxylates—various hydrophobes and EO/PO contents and ratios, Fatty acid esters—mono and diesters; lauric, stearic and oleic; Glycerol esters—with and without EO; lauric, stearic, cocoa and tall oil derived, Ethoxylatedglycerine, Sorbitan esters—with and without EO; lauric, stearic and oleic based; mono and trimesters, Castor oil ethoxylates—5 to 200 moles EO; non-hydrogenated and hydrogenated, Block polymers, Amine oxides—ethoxylated and non-ethoxylated; alkyl dimethyl, Fatty amine ethoxylates—coco, tallow, stearyl, oleyl amines, a polyoxyethylene hydrogenated castor oil or a polyoxypropylene fatty acid ester; salts or derivatives, and mixtures thereof. However, those skilled in the art will appreciate that it is possible to utilize other non-ionic surfactants, without departing from the scope of the present invention.

Amphoteric or Zwitterionic surfactants include one or more of, but not limited to one or more of betaine, coco and lauryl amidopropyl betaines, Coco Alkyl Dimethyl Amine Oxides, alkyl dimethyl betaines; C8 to C18, Alkyl dipropionates—sodium lauriminodipropionate, Cocoamidopropylhydroxysulfobetaine, imidazolines, phospholipids phosphatidylserine, phosphatidylethanolamine, phosphatidylcholine, and sphingomyelins, Lauryl Dimethylamine Oxide, alkyl amphoacetates and proprionates, alkyl Ampho(di)acetates, and diproprionates, lecithin and ethanolamine fatty amides; or salts, derivatives thereof. However, those skilled in the art will appreciate that it is possible to utilize other amphoteric or zwitterionic surfactants, without departing from the scope of the present invention.

Surfactants that are commercially available under the trademark, include, but are not limited to Atlas G5000, TERMUL 5429, TERMUL 2510, ECOTERIC®, EULSOGEN® 118, Genapol® X, Genapol® OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, Cetomacrogol 1000, CHEMONIC OE-20, Triton N-101, Triton X-100, Tween 20, 40, 60, 65, 80, Span20, 40, 60, 80, 83, 85, 120, Brij®, Atlox 4912, Atlas G5000, TERMUL 3512, TERMUL 3015, TERMUL 5429, TERMUL 2510, ECOTERIC®, ECOTERIC® T85, ECOTERIC® T20, TERIC 12A4, EULSOGEN® 118, Genapol® X, Genapol® OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, CHEMONIC OE-20, Triton™ N-101, IGEPAL CA-630 and Isoceteth-20.

However, those skilled in the art will appreciate that it is possible to utilize other conventionally known surfactants without departing from the scope of the present invention. The surfactants are commercially manufactured and available through various companies.

According to an embodiment, the surfactants are present in the amount of 0.1% to 60% w/w of the total composition. According to an embodiment, the surfactants are present in the amount of 0.1% to 50% w/w of the total composition. According to an embodiment, the surfactants are present in the amount of 0.1% to 40% w/w of the total composition. According to an embodiment; the surfactants are present in the amount of 0.1% to 30% w/w of the total composition. According to a further embodiment, the surfactants are present in the amount of 0.1% to 20% w/w of the total composition. According to an embodiment, the surfactants are present in the amount of 0.1% to 10% w/w of the total composition.

According to an embodiment, the solvent used in the crop nutrition and fortification composition includes water miscible solvents. The water miscible solvents include but are not limited to one or more of 1,4-Dioxane, Ethylene glycol, Glycerol, N-Methyl-2-pyrrolidone, 1,3-Propanediol, 1,5-Pentanediol, Propylene glycol, Triethylene glycol, 1,2-Butanediol, 1,3-Butanediol, 1,4-Butanediol, Dimethylformamide, Dimethoxyethane, Dimethyloctanamide and Dimethyldecanamide or mixtures thereof. However, those skilled in the art will appreciate that it is possible to utilize other water miscible solvents without departing from the scope of the present invention.

According to an embodiment, the solvents are present in the amount of 0.1-95% w/w of the total composition. According to an embodiment, the solvents are present in the amount of 0.1-60% w/w of the total composition. According to an embodiment, the solvents are present in the amount of 0.1-40% w/w of the total composition. According to an embodiment, the solvents are present in the amount of 0.1-30% w/w of the total composition.

According to an embodiment, the dispersing agents which are used in the crop nutrition and fortification composition include but are not limited to one or more of polyvinyl pyrrolidone, polyvinyl alcohol, lignin sulphonates, phenyl naphthalene sulphonates, alkali metal, alkaline earth metal and ammonium salts of lignosulfonic acid, lignin derivatives, dibutylnaphthalene—sulfonic acid, alkylarylsulfonates, alkyl sulfates, alkylsulfonates, fatty alcohol sulfates, fatty acids and sulfated fatty alcohol glycol ethers, polyoxyethylene alkyl ethers, dioctyl sulfosuccinate, lauryl sulfate, polyoxyethylene alkyl ether sulphate, polyoxyethylenestyryl phenyl ether sulfate ester salts and the like, alkali metal salts salt thereof, ammonium salts or amine salts, polyoxyethylene alkyl phenyl ether, polyoxyethylenestyryl phenyl ether, polyoxyethylene alkyl esters, or polyoxyethylenesorbitan alkyl esters, and the like, mixture of sodium salt of naphthalene sulphonic acid urea formaldehyde condensate and sodium salt of phenol sulphonic formaldehyde condensate ethoxylated alkyl phenols, ethoxylated fatty acids, alkoxylated linear alcohols, polyaromatic sulfonates, sodium alkyl aryl sulfonates, glyceryl esters, ammonium salts of maleic anhydride copolymers, phosphate esters, condensation products of aryl sulphonic acids and formaldehyde, addition products of ethylene oxide and fatty acid esters, salts of addition products of ethylene oxide and fatty acid esters, sodium salt of isodecylsulfosuccinic acid half ester, polycarboxylates, sodium alkyl benzene sulfonates, sodium salts of sulfonated naphthalene, ammonium salts of sulfonated naphthalene, salts of polyacrylic acids, sodium salts of condensed phenolsulfonic acid as well as the napthalene sulfonate-formaldehyde condensates, sodium naphthalene sulfonate formaldehyde condensates, tristyrylphenolethoxylate phosphate esters; aliphatic alcohol ethoxylates; alkyl ethoxylates; EO-PO block copolymers; graft copolymers, ammonium salts of sulfonated naphthalene, salts of polyacrylic acids.

Commercially available dispersing agents include "Morwet D425" (sodium naphthalene formaldehyde condensate ex Witco Corporation, USA) "Morwet EFW" Sulfated Alkyl Carboxylate and Alkyl Naphthalene Sulfonate—Sodium Salt "Tamol PP" (sodium salt of a phenolsulphonic acid condensate) "Reax 80N" (sodium lignosulphonate) "Wettol D1" sodium alkylnaphthalene sulphonate (ex BASF). However, those skilled in the art will appreciate that it is possible to utilize other conventionally known dispersing agents without departing from the scope of the present invention. The dispersing agents are commercially manufactured and available through various companies.

According to an embodiment, the dispersing agents are present in the amount of 0.1%-60% w/w of the total composition. According to an embodiment, the dispersing agents are present in the amount of 0.1%-30% w/w of the total composition. According to an embodiment, the dispersing agents are present in the amount of 3%-20% w/w of the total composition.

According to an embodiment, the wetting agents used in the crop nutrition and fortification composition include but are not limited to one or more of phenol naphthalene sulphonates, alkyl naphthalene sulfonate, sodium alkyl naphthalene sulfonate, sodium salt of sulfonated alkylcarboxylate, polyoxyalkylated ethyl phenols, polyoxyethoxylated fatty alcohols, polyoxyethoxylated fatty amines, lignin derivatives, alkane sulfonates, alkylbenzene sulfonates, salts of polycarboxylic acids, salts of esters of sulfosuccinic acid, alkylpolyglycol ether sulfonates, alkyl ether phosphates, alkyl ether sulphates and alkyl sulfosuccinic monoesters. However, those skilled in the art will appreciate that it is possible to utilize other conventionally known wetting agents without departing from the scope of the present invention. The wetting agents are commercially manufactured and available through various companies.

According to an embodiment, the wetting agents are present in the amount of 0.1%-60% w/w of the total composition. According to an embodiment, the wetting agents are present in the amount of 0.1%-40% w/w of the total composition. According to an embodiment, the wetting agents are present in the amount of 0.1%-30% w/w of the total composition.

Emulsifiers which is used in the crop nutrition and fortification composition include but are not limited to one or more of Atlas G5000, TERMUL 5429, TERMUL 2510, ECOTERIC®, EMULSOGEN® 118, Genapol® X, Genapol® OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, CHEMONIC OE-20, Triton™ N-101, Tween 20, 40, 60, 65, 80, Span20, 40, 60, 80, 83, 85, 120, Brij®, Triton™ Atlox 4912, Atlas G5000, TERMUL 3512, TERMUL 3015, TERMUL 5429, TERMUL 2510, ECOTERIC®, ECOTERIC® T85, ECOTERIC® T20, TERIC 12A4, EULSOGEN® 118, Genapol® X, Genapol® OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, CHEMONIC OE-20, Triton™ N-101, Tween 20, 40, 60, 65, 80 and Span 20, 40, 60, 80, 83, 85, 120 or mixtures thereof. However, those skilled in the art will appreciate that it is possible to utilize other conventionally known emulsifiers or surfactants without departing from the scope of the present invention. The emulsifiers are commercially manufactured and available through various companies.

According to an embodiment, the emulsifier is present in the amount of 0.1%-60% w/w of the total composition. According to an embodiment, the emulsifier is present in the amount of 0.1%-50% w/w of the total composition. According to an embodiment, the emulsifier is present in the amount of 0.1%-30% w/w of the total composition.

According to an embodiment, the disintegrating agents which are used in the crop nutrition and fortification composition include, but not limited to one or more of inorganic water soluble salts e.g. sodium chloride, nitrate salts; water soluble organic compounds such as agar, hydroxypropyl starch, carboxymethyl starch ether, tragacanth, gelatin, casein, microcrystalline cellulose, cross-linked sodium carboxymethyl cellulose, carboxymethyl cellulose, sodium tripolyphosphate, sodium hexametaphosphate, metal stearates, a cellulose powder, methacrylate copolymer, Polyplasdone® XL-10 (crosslinked polyvinylpyrrolidone), poly (vinylpyrrolidone), polyaminocarboxylic acid chelate compound, salts of polyacrylates of methacrylates, starch-polyacrylonitrile graft copolymer, sodium or potassium bicarbonates/carbonates or their mixtures or salts with acids such as citric and fumaric acid, or salts, derivatives or mixtures thereof. However, those skilled in the art will appreciate that it is possible to utilize different disintegrating agents without departing from the scope of the present invention. The disintegrating agents are commercially manufactured and available through various companies.

According to an embodiment, the disintegrating agents are present in the amount of 0.1% to 50% w/w of the composition. According to an embodiment, the disintegrating agents are present in the amount of 0.1% to 30% w/w of the composition. According to an embodiment, the disintegrating agents are present in the amount of 0.1% to 20% w/w of the composition. According to an embodiment, the disintegrating agents are present in the amount of 0.1% to 10% w/w of the composition.

According to an embodiment, the binding agents or binders which are used in the crop nutrition and fortification composition include, but are not limited to, at least one of proteins, lipoproteins, lipids, glycolipid, glycoprotein, carbohydrates such as monosaccharides, disaccharides, oligosaccharides and polysaccharides, complex organic substance, synthetic organic polymers or derivatives and combinations thereof. The binding agents also include corn syrup, celluloses such as carboxymethyl cellulose, ethyl cellulose, hydroxyethyl cellulose, hydroxy-methylethyl cellulose, hydroxyethylpropyl cellulose, methyl hydroxyethyl cellulose, methyl cellulose; starches; 1, starch acetates, starch hydroxyethyl ethers, ionic starches, long-chain alkyl starches, corn starch, potato starch, xanthan gum, glycogen, agar, gluten, alginic acid, phycocolloids, gum arabic, guar gum, gum karaya, gum tragacanth and locust bean gum. The binding agents or binder also include complex organic substances such as phenyl naphthalene sulphonate, lignin and nitrolignin, derivatives of lignin such as lignosulfonate salts illustratively including calcium lignosulfonate and sodium lignosulfonate and complex carbohydrate-based compositions containing organic and inorganic ingredients such as molasses. The binding agents also include synthetic organic polymers such as ethylene oxide polymers or copolymers, propylene oxide copolymer, polyethylene glycols, polyethylene oxides, polyacrylamides, polyacrylates, polyvinyl pyrrolidone, polyalkylpyrrolidone, polyvinyl alcohol, polyvinylmethyl ether, polyvinyl acrylates, poly(vinyl acetate), sodium polyacrylate, polylactic acid, polyethoxylated fatty acids, polyethoxylated fatty alcohols, latex and the like) or salts, derivatives thereof. However, those skilled in the art will appreciate that it is possible to utilize different binding agents without departing from the scope of the present invention. The binding agents are commercially manufactured and available through various companies.

According to further embodiment, the binding agent is present in an amount of 0.1% to 50% w/w of the composition. According to further embodiment, the binding agent is present in an amount of 0.1% to 30% w/w of the composition According to further embodiment, the binding agent is present in an amount of 0.1% to 20% w/w of the composition. According to further embodiment, the binding agent is present in an amount of 0.1% to 10% w/w of the composition.

According to an embodiment, the carriers which are used in the crop nutrition and fortification composition include, but are not limited to one or more of solid carriers or fillers or diluents. According to another embodiment, the carriers include mineral carriers, plant carriers, synthetic carriers, water-soluble carriers. However, those skilled in the art will appreciate that it is possible to utilize different carriers without departing from the scope of the present invention. The carriers are commercially manufactured and available through various companies.

The solid carriers include natural minerals like clay such as china clay, acid clay, kaolin such as kaolinite, dickite, nacrite, and halloysite, serpentines such as chrysotile, lizardite, antigorite, and amesite, synthetic and diatomaceous silicas, montmorillonite minerals such as sodium montmorillonite, smectites, such as saponite, hectorite, sauconite, and hyderite, micas, such as pyrophyllite, talc, agalmatolite, muscovite, phengite, sericite, and illite, silicas such as cristobalite and quartz, attapulgite and sepiolite; dolomite, gypsum, tuff, vermiculite, laponite, pumice, bauxite, hydrated aluminas, calcined alumina, perlite, sodium bicarbonate, volclay, vermiculites, limestone, natural and synthetic silicates; charcoal, silicas, wet process silicas, dry process silicas, calcined products of wet process silicas, surface-modified silicas, mica, zeolite, diatomaceous earth, calcined aluminas, derivatives thereof; chalks (Omya®), fuller's earth, loess, mirabilite, white carbon, slaked lime, synthetic silicic acid, starch, cellulose, cellulose, chaff, wheat flour, wood flour, starch, rice bran, wheat bran, and soybean flour, tobacco powder, a vegetable powder polyethylene, polypropylene, poly(vinylidene chloride), methyl cellulose, hydroxypropyl cellulose, hydroxypropyl methylcellulose, sodium carboxymethyl cellulose, propylene glycol alginate, polyvinylpyrrolidone, carboxyvinyl polymer, casein sodium, sodium chloride, salt cake, potassium pyrophosphate, sodium tripolyphosphate, maleic acid, fumaric acid, and malic acid or derivatives or mixtures thereof. Commercially available Silicates are Aerosil brands, Sipernat brands such as Sipernat® 50S and CALFLO E, and kaolin 1777. However, those skilled in the art will appreciate that it is possible to utilize different solid carriers without departing from the scope of the present invention. The solid carriers are commercially manufactured and available through various companies.

According to an embodiment, carrier is present in an amount of 0.1% to 98% w/w of the composition. According to further embodiment, the carrier is present in an amount of 0.1% to 80% w/w of the composition. According to further embodiment, the carrier is present in an amount of 0.1% to 60% w/w of the composition. According to further embodiment, the carrier is present in an amount of 0.1% to 40% w/w of the composition. According to further embodiment, the carrier is present in an amount of 0.1% to 20% w/w of the composition.

According to an embodiment, the anticaking agents which are used in the crop nutrition and fortification composition include, but are not limited to one or more of polysaccharides such as starch, alginic acid, poly(vinylpyrrolidone), fumed silica (white carbon), ester gum, a petroleum resin, Foammaster® Soap L sodium stearate, Brij® 700 polyoxyethylene (100) stearylether, Aerosol® OT-B sodium dioctyl sulfosuccinate, Silwet® L-77 silicone-polyether copolymer, sodium metasilicate, sodium alkyl sulfosuccinates, sodium carbonate or bicarbonate, salts or derivatives thereof. However, those skilled in the art will appreciate that it is possible to utilize different anti caking agents without departing from the scope of the present invention. The anti caking agents are commercially manufactured and available through various companies.

According to an embodiment, the antifoaming agents or defoamers which are used in the crop nutrition and fortification composition include, but not limited to one or more of silica, siloxane, silicone dioxide, polydimethyl siloxane, alkyl polyacrylates, ethylene oxide/propylene oxide copolymers, polyethylene glycol, Silicone oils and magnesium stearate or derivatives thereof. Preferred antifoaming agents include silicone emulsions (such as, e.g., Silikon® SRE, Wacker or Rhodorsil® from Rhodia), long-chain alcohols, fatty acids, fluoroorganic compounds. However, those skilled in the art will appreciate that it is possible to utilize other conventionally known antifoaming agents without departing from the scope of the present invention.

The antifoaming agents are commercially manufactured and available through various companies. According to an embodiment, the anti-foaming agent is present in an amount of 0.01% to 20% w/w of the total composition. According to an embodiment, the anti-foaming agent is present in an amount of 0.01% to 10% w/w of the total composition. According to an embodiment, the anti-foaming agent is present in an amount of 0.01% to 5% w/w of the total composition. According to an embodiment, the anti-foaming agent is present in an amount of 0.01% to 1% w/w of the total composition.

According to an embodiment, the pH-adjusters or buffers or neutralizing agents which are used in the crop nutrition and fortification composition include both acids and bases of the organic or inorganic type and mixtures thereof. According to further embodiment, pH-adjusters or buffers or neutralizing agents include, but not limited to organic acids, inorganic acids and alkali metal compounds or salts, derivatives or mixtures thereof. According to an embodiment, the organic acids include, but not limited to one or more of citric, malic, adipic, fumaric, maleic, succinic, and tartaric acid, or salts, derivatives thereof; and the mono-, di-, or tribasic salts of these acids or derivatives thereof. Alkali metal compounds include hydroxides of alkali metals such as sodium hydroxide and potassium hydroxide, carbonates of alkali metals, hydrogencarbonates of alkali metals such as sodium hydrogen carbonate and alkali metal phosphates such as sodium phosphate and mixtures thereof. According to an embodiment, the salts of inorganic acids include, but not limited to one or more of alkali metal salts such as lithium chloride, sodium chloride, potassium chloride, lithium nitrate, sodium nitrate, potassium nitrate, lithium sulfate, sodium sulfate, potassium sulfate, sodium monohydrogen phosphate, potassium monohydrogen phosphate, sodium dihydrogen phosphate, potassium dihydrogen phosphate and the like. Mixtures can also be used to create a pH-adjusters or buffers or neutralizing agents. However, those skilled in the art will appreciate that it is possible to utilize other conventionally known pH-adjusters or buffers or neutralizing agents without departing from the scope of the present invention.

The pH-adjusters or buffers or neutralizing agents are commercially manufactured and available through various companies. According to an embodiment, the pH-adjusters or buffers are present in an amount of 0.01% to 20% w/w of the total composition.

According to an embodiment, the pH-adjusters or buffers are present in an amount of 0.01% to 10% w/w of the total composition. According to an embodiment, the pH-adjusters or buffers are present in the amount of 0.01% to 5% w/w of the total composition. According to an embodiment, the pH-adjusters or buffers are present in the amount of 0.01% to 1% w/w of the total composition.

According to an embodiment, the spreading agents which are used in the crop nutrition and fortification composition include, but not limited to one or more of cellulose powder, crosslinked poly(vinylpyrrolidone), a half ester of a polymer consisting of polyhydric alcohol with dicarboxylic anhydride, a water-soluble salt of polystyrenesulfonic acid, fatty acids, latex, aliphatic alcohols, vegetable oils such as cottonseed, or inorganic oils, petroleum distillates, modified trisiloxanes, polyglycol, polyethers, clatharates or salts or derivatives thereof. However, those skilled in the art will appreciate that it is possible to utilize other conventionally known spreading agents without departing from the scope of the present invention. The spreading agents are commercially manufactured and available through various companies.

According to an embodiment, the spreading agent is present in an amount of 0.1% to 20% w/w of the total composition. According to an embodiment, the spreading agent is present in an amount of 0.1% to 10% w/w of the total composition. According to an embodiment, the spreading agent is present in an amount of 0.1% to 5% w/w of the total composition. According to an embodiment, the spreading agent is present in an amount of 0.1% to 1% w/w of the total composition.

According to an embodiment, the sticking agents which are used in the crop nutrition and fortification composition include, but not limited to one or more of paraffin, a polyamide resin, polyacrylate, polyoxyethylene, wax, polyvinyl alkyl ether, an alkylphenol-formalin condensate, fatty acids, latex, aliphatic alcohols, vegetable oils such as cottonseed, or inorganic oils, petroleum distillates, modified trisiloxanes, polyglycol, polyethers, clatharates, a synthetic resin emulsion or salts or derivatives thereof. However, those skilled in the art will appreciate that it is possible to utilize other conventionally known sticking agents without departing from the scope of the present invention. The sticking agents are commercially manufactured and available through various companies.

According to an embodiment, the sticking agent is present in an amount of 0.1% to 30% w/w of the total composition. According to an embodiment, the sticking agent is present in an amount of 0.1% to 20% w/w of the total composition. According to an embodiment, the sticking agent is present in an amount of 0.1% to 10% w/w of the total composition.

According to an embodiment, the stabilizers which are used in the crop nutrition and fortification composition include, but not limited to one or more of peroxide compounds such as hydrogen peroxide and organic peroxides, alkyl nitrites such as ethyl nitrite and alkyl glyoxylates such as ethyl glyoxylate, zeolite, antioxidants such as phenol compounds, amine compounds, phosphoric acid compounds and the like; ultraviolet absorbers such as salicylic acid compounds, benzophenone compounds or derivatives thereof. However, those skilled in the art will appreciate that it is possible to utilize other conventionally known stabilizers without departing from the scope of the present invention. The stabilizers are commercially manufactured and available through various companies.

According to an embodiment, the stabilizer is present in an amount of 0.1% to 30% w/w of the total composition. According to an embodiment, the stabilizer is present in an amount of 0.1% to 20% w/w of the total composition. According to an embodiment, the stabilizer is present in an amount of 0.1% to 10% w/w of the total composition.

According to an embodiment, the preservatives which are used in the crop nutrition and fortification composition include but not limited to one or more of bactericides, anti-fungal agents, biocides, anti-microbial agents, and anti-oxidant. Non limiting examples of preservatives include one or more of benzoic acid, its esters and salts, para-hydroxybenzoic acid (paraben), its esters and salts, propionic acid and its salts, salicylic acid and its salts, 2,4-hexadienoic acid (sorbic acid) and its salt, formaldehyde and paraformaldehyde, 1,2-benzisothiazolin-3-one, 2-hydroxybiphenyl ether and its salts, 2-zincsulfidopyridine N-oxide, inorganic sulfites and bisulfites, sodium iodate, chlorobutanol, dehydraacetic acid, formic acid, 1,6-bis(4-amidino-2-bromophenoxy)-n-hexane and its salts, 10-undecylenic acid and its salts, 5-amino-1,3-bis(2-ethylhexyl)-5-methylhexahydropyrimidine, 5-bromo-5-nitro-1,3-dioxane, 2-bromo-2-nitropropane-1,3-diol, 2,4-dichlorobenzyl alcohol, N-(4-chlorophenyl)-N'-(3,4-dichlorophenyl)urea, 4-chloro-m-cresol, 2,4,4'-trichloro-2'-hydroxy diphenyl ether, 4-chloro-3,5-dimethyl phenol, 1,1'-methylene-bis(3-(1-hydroxy methyl-2, 4-dioximidazolidin-5-yl)urea), poly(hexamethylenediguanide) hydrochloride, 2-phenoxyethanol, hexamethylenetetramine, 1-(3-chloroallyl)-3,5,7-triaza-1-azonia-adamantane chloride, 1(4-chlorophenoxy)-1-(1H-imidazol-1-yl)-3,3-dimethyl-2-butanone, 1,3-bis(hydroxymethyl)-5,5-dimethyl-2,4-imidazolidinedione, benzyl alcohol, octopirox, 1,2-dibromo-2,4-dicyanobutane, 2,2'-methylenebis(6-bromo-4-chlorophenol), bromochlorophene, dichlorophene, 2-benzyl-4-chlorophenol, 2-chloroacetamide, chlorhexidine, chlorhexidine acetate, chlorhexidine gluconate, chlorhexidine hydrochloride, 1-phenoxypropan-2-ol, N-alkyl(C12-C22)trimethylammonium bromide and chloride, 4,4-dimethyl-1,3-oxazolidine, N-hydroxymethyl-N-(1,3-di(hydroxymethyl)-2,5-dioxoimidazolidin-4-yl)-N'-hydroxymethylurea, 1,6-bis(4-amidinophenoxy)-n-hexane and its salts, glutaraldehyde, 5-ethyl-1-aza-3,7-dioxabicyclo(3.3.0)octane, 3-(4-chlorophenoxy) propane-1,2-diol, Hyamine, alkyl(C8-C18) dimethylbenzylammonium chloride, alkyl(C8-C18) dimethylbenzylammonium bromide, alkyl(C8-C18) dimethylbenzylammonium saccharinate, benzyl hemiformal, 3-iodo-2-propynyl butylcarbamate, sodium hydroxymethylaminoacetate, cetyltrimethylammonium bromide, cetylpyridinium chloride, and derivatives of 2H isothiazol-3-one (so-called isothiazolone derivatives) such as alkylisothiazolones (for example 2-methyl-2H-isothiazol-3-one, MIT; chloro-2-methyl-2H-isothiazol-3-one, CIT), benzoisothiazolones (for example 1,2-benzoisothiazol-3(2H)-one, BIT, commercially available as Proxel® types from ICI) or 2-methyl-4,5-trimethylene-2H-isothiazol-3-one (MTIT), C1-C4-alkyl para-hydroxybenzoate, an dichlorophene, Proxel® from ICI or Acticide® RS from Thor Chemie and Kathon® MK from Rohm & Haas, Bacto-100, thimerosal, Sodium Propinoate, Sodium Benzoate, Propyl Paraben, Propyl Paraben Sodium, Potassium Sorbate, Potassium Benzoate, Phenyl Mercuric Nitrate, Phenyl Ethyl Alcohol, Sodium, Ethylparaben, Methylparaben, Butylparaben, Benzyl Alcohol, Benzothonium Chloride, Cetylpyridinium Chloride, Benzalkonium Chloride, 1,2-benzothiazol-3-one, Preventol® (Lanxess®), Butylhydroxytoluene, potassium sorbate, iodine-containing organic compounds such as 3-bromo-2,3-diiodo-2-propenyl ethyl carbonate, 3-iodo-2-propynyl butyl carbamate, 2,3,3-triiodo allyl alcohol, and parachlorophenyl-3-iodopropargylformal; benzimidazole compounds and benzthiazole compounds such as 2-(4-thiazolyl)benzimidazole and 2-thiocyanomethylthiobenzo-thiazole; triazole compounds such as 1-(2-(2',4'-dichlorophenyl)-1,3-dioxolane-2-ylmethyl)-1H-1,2,4-triazole, 1-(2-(2', 4'-dichloro phenyl)-4-propyl-1,3-dioxolane-2-ylmethyl)-1H-1,2,4-triazole, and α-(2-(4-chlorophenyl) ethyl)-α-(1,1-dimethyl ethyl)-1H-1,2,4-triazole-1-ethanol; and naturally occurring compounds such as 4-isopropyl tropolone (hinokitiol) and borax or salts or derivatives thereof. Antioxidants includes but not limited to one or more of imidazole and imidazole derivatives (e.g. urocanic acid), 4,4'-thiobis-6-t-butyl-3-methylphenol, 2,6-di-t-butyl-p-cresol (BHT), and pentaerythrityltetrakis[3-(3,5,-di-t-butyl-4-hydroxyphenyl)]propionate; amine antioxidants such as N,N'-di-2-naphthyl-p-phenylenediamine; hydroquinoline antioxidants such as 2,5-di(t-amyl)hydroquinoline; and phosphorus-containing antioxidants such as triphenyl phosphate, carotenoids, carotenes (e.g. α-carotene, β-carotene, lycopene) and derivatives thereof, lipoic acid and derivatives thereof (e.g. dihydrolipoic acid), aurothioglucose, propylthiouracil and further thio compounds (e.g. thioglycerol, thiosorbitol, thioglycolic acid, thioredoxin, and the glycosyl, N-acetyl, methyl, ethyl, propyl, amyl, butyl, lauryl, palmitoyl, oleyl, γ-linoleyl, cholesteryl and glyceryl esters thereof), and salts thereof, dilaurylthiodipropionate, distearylthiodipropionate, thiodipropionic acid and derivatives thereof (esters, ethers, lipids, nucleotides, nucleosides and salts), and sulfoximine compounds (e.g. buthioninesulfoximi-nes, homocysteine sulfoximine, buthionine sulfones, penta-, hexa-, heptathioninesul-foximine) in very low tolerated doses (e.g. pmol/kg to pmol/kg), also metal chelating agents (e.g. α-hydroxy fatty acids, EDTA, EGTA, phytic acid, lactoferrin), α-hydroxy acids (e.g. citric acid, lactic acid, malic acid), humic acids, gallic esters (e.g. propyl, octyl and dodecyl gallate), unsaturated fatty acids and derivatives, hydroquinone and derivatives thereof (e.g. arbutin), ubiquinone and ubiquinol, and derivatives thereof, ascorbyl palmitate, stearate, di-palmitate, acetate, Mg ascorbyl phosphates, sodium and magnesium ascorbate, diso-diumascorbyl phosphate and sulfate, potassium ascorbyltocopheryl phosphate, isoascorbic acid and derivatives thereof, the coniferyl benzoate of benzoin resin, rutin, rutinic acid and derivatives thereof, disodium rutinyldisulfate, dibutylhydroxytoluene, 4,4-thiobis-6-tert-butyl-3-methylphenol, butylhydroxy anisole, p-octylphenol, mono-(di- or tri-) methyl benzylphenol, 2,6-tert-butyl-4-methylphenol, pentaerythritol-tetrakis 3-(3, 5-di-tert-butyl-4-hydroxyphenyl)propionate, butylhydroxy-anisol, nordihydroguaiacic acid, nordihydroguaiaretic acid, trihydroxybutyrophenone, uric acid and derivatives thereof, mannose and derivatives thereof, selenium and selenium derivatives (e.g. selenomethionine), stilbenes and stilbene derivatives (e.g. stilbene oxide, trans-stilbene oxide). However, those skilled in the art will appreciate that it is possible to utilize other conventionally known preservatives without departing from the scope of the present invention. The preservatives are commercially manufactured and available through various companies.

According to further embodiment, the preservatives or bactericides or anti-fungal agents or biocides or anti-microbial agents or antioxidant are present in an amount of 0.1% to 20% w/w of the total composition. According to further embodiment, the preservatives or bactericides or anti-fungal agents or biocides or anti-microbial agents or antioxidant are present in an amount of 0.1% to 10% w/w of the total composition. According to further embodiment, the preservative or bactericides or anti-fungal agents or biocides or anti-microbial agents or antioxidant is present in an amount of 0.1% to 5% w/w of the total composition. According to further embodiment, the preservative or bactericides or anti-fungal agents or biocides or anti-microbial agents or antioxidant is present in an amount of 0.1% to 1% w/w of the total composition.

According to an embodiment, the antifreezing agents or freezing point depressants used in the liquid suspension composition include, but are not limited to one or more of polyhydric alcohols such as ethylene glycol, diethylene glycol, dipropylene glycol, propylene glycol, butyrolactone, N,N-dimethyl-formamide, glycerol, monohydric or polyhydric alcohols, glycol ethers, glycol ethers, glycol monoethers such as the methyl, ethyl, propyl and butyl ether of ethylene glycol, diethylene glycol, propylene glycol and dipropylene glycol, glycol diethers such as methyl and ethyl diethers of ethylene glycol, diethylene glycol and dipropyleneglycol. or urea, especially calcium chloride, isopropanol, propylene glycol monomethyl ether, di- or tripropylene glycol monomethyl ether or cyclohexanol. However, those skilled in the art will appreciate that it is possible to utilize different antifreezing agents without departing from the scope of the present invention. The antifreezing agents are commercially manufactured and available through various companies.

According to an embodiment, the chelating or complexing or sesquitering agents which are used in the liquid suspension composition include, but not limited to one or more of polycarboxylic acids such as polyacrylic acid and the various hydrolyzed poly(methyl vinyl ether/maleic anhydride); aminopolycarboxylic acids, such as N-hydroxyethyliminodiacetic acid, nitrilotriacetic acid (NTA), N,N,N', N'-ethylenediaminetetraacetic acid, N-hydroxyethyl-N, N',N'-ethylenediaminetriacetic acid and N,N,N',N'',N'''-diethylenetriaminepentaacetic acid; α-hydroxy acids, such as citric acid, tartaric acid and gluconic acid; orthophosphates, such as trisodium phosphate, disodium phosphate, monosodium phosphate; condensed phosphates, such as sodium tripolyphosphate, tetrasodium pyrophosphate, sodium hexametaphosphate and sodium tetrapolyphosphate; 5-sulfo-8-hydroxyquinoline; and 3,5-disulfopyrocatechol, amino polycarboxylates, ethylene diamine tetraacetic acid (EDTA), diethylenetriaminepentaacetic acid (DTPA), N-hydroxyethyl-ethylenediamine-triacetic acid (HEDTA), ethylenediaminediacetate (EDDA), ethylenediamindi(o-hydroxyphenylacetic) acid (EDDHA), cyclohexane diamine tetraacetic acid (CDTA), polyethyleneaminepolyacetic acids, lignosulfonate, Ca—, K—, Na—, and ammonium lignosulfonates, fulvic acid, ulmic acid, nucleic acids, humic acid, pyrophosphate, chelating resins such as imino di-acetic acid and the like or derivatives thereof. However, those skilled in the art will appreciate that it is possible to utilize other chelating or complexing or sesquitering agents without departing from the scope of the present invention. The chelating or complexing or sesquitering agents are commercially manufactured and available through various companies.

According to an embodiment, the penetrants which are used in the liquid suspension composition include, but not limited to one or more of alcohol, glycol, glycol ether, ester, amine, alkanolamine, amine oxide, quaternary ammonium compound, triglyceride, fatty acid ester, fatty acid ether, N-methyl pyrrolidone, dimethylformamide, dimethylacetamide, or dimethyl sulfoxide, polyoxyethylenetrimethylolpropanemonooleate, polyoxyethylenetrimethylolpropanediole ate, polyoxyethylenetrimethylolpropanetrioleate, polyoxyethylenesorbitanmonooleate, and polyoxyethylene sorbitol hexaoleate. However, those skilled in the art will appreciate that it is possible to utilize different penetrants without departing from the scope of the present invention. The penetrants are commercially manufactured and available through various companies.

According to an embodiment, the ultraviolet absorbents are selected from, but are not limited to one or more of 2-(2'-hydroxy-5'-methylphenyl)benzotriazole, 2-ethoxy-T-ethyloxazalic acid bisanilide, succinic acid dimethyl-1-(2-hydroxyethyl)-4-hydroxy-2,2,6,6-tetramethylpiperidine polycondensate, benzotriazole compounds such as 2-(2'-hydroxy-5'-methylphenyl)benzotriazole and 2-(2'-hydroxy-4'-n-octoxyphenyl)benzotriazole; benzophenone compounds such as 2-hydroxy-4-methoxybenzophenone and 2-hydroxy-4-n-octoxybenzophenone; salicylic acid compounds such as phenyl salicylate and p-t-butylphenyl salicylate; 2-ethylhexyl 2-cyano-3,3-diphenyl acrylate, 2-ethoxy-2'-ethyl oxalic bisanilide, and dimethyl succinate-1-(2-hydroxyethyl)-4-hydroxy-2,2,6,6-tetramethylpiperidine polycondensate or derivatives or the like. However, those skilled in the art will appreciate that it is possible to utilize different ultraviolet absorbents, without departing from the scope of the present invention. Such ultraviolet absorbents are commercially manufactured and available through various companies.

According to an embodiment, the UV ray scattering agents includes titanium dioxide or the like may be used. However, those skilled in the art will appreciate that it is possible to utilize different UV ray scattering agents, without departing from the scope of the present invention. Such UV ray scattering agents are commercially manufactured and available through various companies.

According to an embodiment, the humectant is selected from, but not limited to one or more of polyoxyethylene/polyoxypropylene copolymers, particularly block copolymers, such as the Synperonic PE series of copolymers available from Uniqema or salts, derivatives thereof. Other humectants are propylene glycol, monoethylene glycol, hexylene glycol, butylene glycol, ethylene glycol, diethylene glycol, poly (ethylene glycol), poly (propylene glycol), glycerol and the like; polyhydric alcohol compounds such as propylene glycol ether, derivatives thereof. Also other humectants include aloe vera gel, alpha hydroxyl acids such as lactic acid, egg yolk and eggwhite, glyceryl triacetate, honey, lithium chloride, etc. Some of the humectants mentioned above also act as non-ionic surfactants. However, those skilled in the art will appreciate that it is possible to utilize other conventionally known humectants without departing from the scope of the present invention. The humectants are commercially manufactured and available through various companies.

According to an embodiment, the humectant is present in the range of 0.1% to 90% w/w of the total composition. According to an embodiment, the humectant is present in the range of 0.1% to 70% w/w of the total composition. According to an embodiment, the humectant is present in the range of 0.1% to 60% w/w of the total composition. According to an embodiment, the humectant is present in the range of 0.1% to 50% w/w of the total composition. According to an embodiment, the humectant is present in the range of 0.1% to 30% w/w of the total composition. According to an embodiment, the humectant is present in the range of 0.1% to 10% w/w of the total composition.

The inventors have further determined that the composition of the present invention surprisingly has enhanced physical properties of dispersibility, suspensibility, flowability, wetting time, good pourability, reduced viscosity, provides ease of handling and also reduces the loss of material while handling the product at the time of packaging as well as during field application. Surprisingly, the inventors have also determined that the crop nutrition and fortification composition in the form of liquid suspension and water dispersible granules display superior efficacy even when applied at reduced dosages compared to prior art composition.

Dispersibility of the water dispersible granular crop nutrition and fortification composition is a measure of percent dispersion. Dispersibility is calculated by the minimum percent dispersion. Dispersibility is defined as the ability of the granules to disperse upon addition to a liquid such as water or a solvent. To determine dispersibility of the granular composition as per the standard CIPAC test, MT 174, a known amount of the granular composition was added to a defined volume of water and mixed by stirring to form a suspension. After standing for a short period, the top nine-tenths are drawn off and the remaining tenth dried and determined gravimetrically. The method is virtually a shortened test of suspensibility and is appropriate for establishing the ease with which the granular composition dispersed uniformly in water.

It is observed that the crop nutrition and fortification composition in the form of water dispersible granules exhibits almost instantaneous dispersion, thus making the actives readily available to the crop. According to an embodiment, the crop nutrition and fortification composition in the form of water dispersible granules has a dispersibility of at least 40%. According to an embodiment, the crop nutrition and fortification composition in the form of water dispersible granules has a dispersibility of at least 50%. According to an embodiment, the water dispersible granules have a dispersibility of at least 60%. According to an embodiment, the water dispersible granules have a dispersibility of at least 70%. According to an embodiment, the water dispersible granules have a dispersibility of at least 80%. According to an embodiment, the water dispersible granules have a dispersibility of at least 90%. According to an embodiment, the water dispersible granules have a dispersibility of at least 99%. According to an embodiment, the water dispersible granules have a dispersibility of 100%.

According to an embodiment, the crop nutrition and fortification composition in the form of water dispersible granules and liquid suspension exhibits good suspensibility. Suspensibility is defined as the amount of active ingredient suspended after a given time in a column of liquid, of stated height, expressed as a percentage of the amount of active ingredient in the original suspension. The water dispersible granules can be tested for suspensibility as per the CIPAC Handbook, "MT 184 Test for Suspensibility" whereby a suspension of known concentration of the granular composition in CIPAC Standard Water was prepared and placed in a prescribed measuring cylinder at a constant temperature, and allowed to remain undisturbed for a specified time. The top 9/10ths were drawn off and the remaining 1/10th was then assayed, either chemically, gravimetrically, or by solvent extraction, and the suspensibility was calculated.

The suspensibility of the liquid suspension is the amount of active ingredient suspended after a given time in a column of liquid, of stated height, expressed as a percentage of the amount of active ingredient in the original suspension. The suspensibility of the liquid suspension is determined as per CIPAC MT-161 by preparing 250 ml of diluted suspension, allowing it to stand in a measuring cylinder under defined conditions, and removing the top nine-tenths. The remaining tenth portion is then assayed either chemically, gravimetrically or by solvent extraction, and the suspensibility is calculated.

According to an embodiment, the crop nutrition and fortification composition in the form of water dispersible granules and liquid suspension has a suspensibility of at least 30%. According to an embodiment, the crop nutrition and fortification composition in the form of water dispersible granules and liquid suspension has a suspensibility of at least 40%. According to an embodiment, the crop nutrition and fortification composition in the form of water dispersible granules and liquid suspension has a suspensibility of at least 50%. According to an embodiment, the crop nutrition and fortification composition in the form of water dispersible granules and liquid suspension has a suspensibility of at least 60%. According to an embodiment, the crop nutrition and fortification composition in the form of water dispersible granules and liquid suspension has a suspensibility of at least 70%. According to an embodiment, the crop nutrition and fortification composition in the form of water dispersible granules and liquid suspension has a suspensibility of at least 80%. According to an embodiment, the crop nutrition and fortification composition in the form of water dispersible granules and liquid suspension has a suspensibility of at least 90%. According to an embodiment, the crop nutrition and fortification composition in the form of water dispersible granules and liquid suspension has a suspensibility of at least 99%. According to an embodiment, the crop nutrition and fortification composition in the form of water dispersible granules and liquid suspension has a suspensibility of 100%.

According to an embodiment, the crop nutrition and fortification composition in the form of water dispersible granules has almost no hardness. The hardness exhibited by the granules can be estimated by hardness testers such as the ones provided by Shimadzu, Brinell Hardness (AKB-3000 Model), Mecmesin, Agilent, Vinsyst, Ametek and Rockwell.

According to an embodiment, the crop nutrition and fortification composition in the form of water dispersible granules and liquid suspension demonstrates superior stability towards heat, light, temperature and caking. According to further embodiment, the stability exhibited by the crop nutrition and fortification composition is more than 3 years. According to further embodiment, the stability exhibited by the crop nutrition and fortification composition is more than 2 years. According to further embodiment, the stability exhibited by the crop nutrition and fortification composition is more than 1 year. According to further embodiment, the stability exhibited by the crop nutrition and fortification composition is more than 10 months. According to further embodiment, the stability exhibited by the crop nutrition and fortification composition is more than 8 months. According to further embodiment, the stability exhibited by the crop nutrition and fortification composition is more than 6 months. According to further embodiment, the stability exhibited by the crop nutrition and fortification composition is more than 3 months.

Wettability is the condition or the state of being wettable and can be defined as the degree to which a solid is wetted by a liquid, measured by the force of adhesion between the solid and liquid phases. The wettability of the granular composition is measured using the Standard CIPAC Test MT-53 which describes a procedure for the determination of the time of complete wetting of wettable formulations. A weighed amount of the granular composition can be dropped on water in a beaker from a specified height and the time for complete wetting was determined. According to another embodiment, the water dispersible granular composition has wettability of less than 2 minutes. According to another embodiment, the water dispersible granular composition has a wettability of less than 1 minute. According to another embodiment, the water dispersible granular composition has a wettability of less than 30 seconds.

According to an embodiment, the crop nutrition and fortification composition in the form of liquid suspension passes the wet sieve retention test. The test is used to determine the amount of non-dispersible material in the formulations that are applied as dispersions in water. The wet sieve retention value of the crop nutrition and fortification composition in the form of liquid suspension and water dispersible granules can be measured by using the Standard CIPAC Test MT-185 which describes a procedure for the measuring the amount of material retained on the sieve. A sample of the formulation is dispersed in water and the suspension formed is transferred to a sieve and washed. The amount of the material retained on the sieve is determined by drying and weighing.

According to an embodiment, the crop nutrition and fortification composition has a wet sieve retention value on a 75 micron sieve of less than 10%. According to an embodiment, the crop nutrition and fortification composition has a wet sieve retention value on a 75 micron sieve of less than 7%. According to an embodiment, the crop nutrition and fortification composition has a wet sieve retention value on a 75 micron sieve of less than 5%. According to an embodiment, the crop nutrition and fortification composition has a wet sieve retention value on a 75 micron sieve of less than 2%.

According to an embodiment, the crop nutrition and fortification composition in the form of liquid suspension does not form a thick paste and is easily pourable. The viscosity of a fluid is a measure of its resistance to gradual deformation by shear stress or tensile stress.

The viscosity of the liquid suspension is determined by (as per CIPAC MT-192). A sample is transferred to a standard measuring system. The measurement is carried out under different shear conditions and the apparent viscosities are determined. During the test, the temperature of the liquid is kept constant. According to an embodiment, the aqeuous suspension composition has a viscosity at 25° C. of about 10 cps to about 1200 cps, which makes it pourable. According to an embodiment, the aqeuous suspension composition has viscosity at 25° C. of about 10 cps to about 500 cps. According to an embodiment, the aqeuous suspension composition has a viscosity at 25° C. of about less than 500 cps. According to an embodiment, the aqeuous suspension composition has viscosity at 25° C. of about 10 cps to about 400 cps. According to an embodiment, the aqeuous suspension composition has viscosity at 25° C. of about 10 cps to about 300 cps. The crop nutrition and fortification composition having a viscosity in the range of 10 cps-1200 cps makes it pourable. Too viscous and highly concentrated composition tends to form a cake, making it unpourable and thus is undesirable.

According to an embodiment, the crop nutrition and fortification composition in the form of water dispersible granules and liquid suspension demonstrates superior stability in terms of suspensibility under accelerated storage condition (ATS). According to an embodiment, the crop nutrition and fortification composition demonstrates suspensibility of more than 90% under ATS. According to an embodiment, the crop nutrition and fortification composition demonstrates suspensibility of more than 80% under ATS. According to an embodiment, the crop nutrition and fortification composition demonstrates suspensibility of more than 70% under ATS. According to an embodiment, the crop nutrition and fortification composition demonstrates suspensibility of more than 60% under ATS. According to an embodiment, the crop nutrition and fortification composition demonstrates suspensibility of more than 50% under ATS. According to an embodiment, the crop nutrition and fortification composition demonstrates suspensibility of more than 40% under ATS. According to an embodiment, the crop nutrition and fortification composition demonstrates suspensibility of more than 30% under ATS. According to an embodiment, the crop nutrition and fortification composition demonstrates suspensibility of more than 20% under ATS.

According to another embodiment, the invention relates to the process for preparing the crop nutrition and fortification composition comprising one or more of manganese salts, complexes, derivatives or mixtures thereof, elemental sulphur and at least one dispersing agent in the form of water dispersible granules. The crop nutrition and fortification composition in the form of water dispersible granules is made by various techniques such as spray drying, fluidized bed granulation, extrusion, freeze drying, etc.

According to an embodiment, the process of preparing a water dispersible granular composition involves milling a blend of one or more of manganese salts, complexes, derivatives or mixtures thereof in a concentration range of 0.1% to 70% by weight of the total composition; elemental sulphur in a concentration range of 1% to 90% by weight of the total composition and at least one dispersing agent to obtain a slurry or a wet mix. The milling is carried out by using a suitable bead mill or a wet grinding equipment to obtain a particle size in the range of 0.1 to 20 microns. According to an embodiment, the milling step further involves optionally adding one or more agriculturally acceptable excipients to obtain the slurry. According to an embodiment, the blending step can further optionally include an additional active ingredients selected from one or more of fertilizers, micronutrients, macronutrients, biostimulants, pesticidal actives or mixtures thereof. The wet mix obtained is then dried to obtain a granule, for instance in a spray dryer, fluid bed dryer or any suitable granulating equipment. The spray drying process is followed by sieving to remove the under sized and the oversized granules to obtain microgranules of the desired size.

According to another embodiment, the crop nutrition and fortification composition in the form of water dispersible granules are also made by dry milling one or more of manganese salts, complexes, derivatives or mixtures thereof, elemental sulphur and at least one dispersing agent in an air mill or a jet mill to obtain the desired particle size in the range of 0.1 to 20 microns, preferably 0.1 to 10 microns. Water is added to the dry powder and the mixture is blended to obtain a dough or paste, which is then extruded through an extruder to obtain the granules of desired size.

According to another embodiment, the invention relates to the process for preparing the crop nutrition and fortification composition in the form of liquid suspension. According to further embodiment, the invention relates to a process for preparing the liquid suspension composition comprising one or more of manganese salts, complexes, derivatives or mixtures thereof, elemental sulphur, at least one agrochemically acceptable excipients, and at least one structuring agent.

According to an embodiment, the process of preparing the liquid suspension composition involves homogenization of one or more agrochemically acceptable excipients such as surfactants, by feeding them into a vessel provided with stirring facilities. The manganese salts, complexes, derivatives or mixtures thereof and elemental sulphur were further added to the homogenized blend and stirred continued for approximately 5 to 10 minutes until the total mixture becomes homogeneous. Subsequently, the liquid suspension obtained is passed through a suitable wet milling equipment to obtain a suspension with a particle size in the range of 0.1 to 20 microns, preferably 0.1 to 10 microns. Then, requisite quantity of the structuring agent is added to the suspension obtained, under continuous homogenization to obtain the liquid suspension composition.

According to an embodiment, the invention further relates to the use of the crop nutrition or fortification composition as at least one of a nutrient composition, a crop strengthener composition, a soil conditioner composition, crop fortification, crop protection and a yield enhancer composition.

According to further embodiment, the invention relates to a method of application of an effective amount of the crop nutrition and fortification composition including one or more of manganese salts, complexes, derivatives or mixtures thereof, elemental sulphur and the agrochemical excipient with particles in the size range of 0.1 to 20 microns, wherein the composition is applied to the seeds, seedlings, crops, a plant, plant propagation material, locus, parts thereof or to the surrounding soil.

According to an embodiment, the invention further relates to a method of improving the soil fertility, plant health, improving the crop nutrition by facilitating the uptake of essential nutrients, protecting the plant, enhancing the plant yield, strengthening the plant or conditioning the soil; the method comprising treating at least one of seeds, seedling, crops, a plant, plant propagation material, locus, parts thereof or to the surrounding soil with effective amount of the crop nutrition and fortification composition which include one or more of manganese salts, complexes, derivatives or mixtures thereof; elemental sulphur and at least one agrochemically acceptable excipient with particles in the size range of 0.1 to 20 microns.

The composition is applied through a variety of methods. Methods of applying to the soil includes any suitable method, which ensures that the composition penetrates the soil, for example, nursery tray application, in furrow application, drip irrigation, sprinkler irrigation, soil drenching, soil injection, top dressing, broad casting or incorporation into the soil, and such other methods. The composition is also applied in the form of a foliar spray. The rates of application or the dosage of the composition depends on the type of use, manganese and sulphur deficiency level of soil an plants, the type of crops, or the specific active ingredients in the composition but is such that the agrochemical active ingredient, is in an effective amount to provide the desired action (such as nutrient uptake plant vigor, crop yield).

Preparation Examples

The following examples illustrate the basic methodology and versatility of the composition of the invention. It is recognized that changes may be made to the specific parameters and ranges disclosed herein and that there may be a number of different ways known in the art to change the disclosed variables. However, it should be noted that these preparation examples are merely exemplary and are not intended to limit the scope of the invention. And whereas it is understood that only the preferred embodiments of these elements are disclosed herein as set forth in the specification and drawings, the invention should not be so limited and should be construed in terms of the spirit and scope of the claims that follow.

A. Water Dispersible Granular Composition of Manganese and Elemental Sulphur

Example 1: Water dispersible granular composition of Manganese chloride and elemental sulphur was prepared by blending 80 parts of elemental sulphur, 10 parts of manganese chloride and 10 parts of sodium lignosulphonate (Reax 100) to obtain an additive mix. The mixture obtained was wet milled using a suitable bead mill or a wet grinding equipment to obtain an average particle size of less than 20 microns. The wet milled slurry obtained was then spray dried at an inlet temperature of less than 170 degree C. and an outlet temperature less than 70° C., followed by sieving to remove the under sized and the oversized granules and obtain a water dispersible granular composition of Sulphur 80% and Manganese chloride 10%. The composition had the following particle size distribution: D10 less than 0.9 microns; D50 less than 4 microns and D90 less than 12 microns. The granule size of the composition is in the range of 0.1-2.5 mm.

The composition had a dispersibility of 85% and a suspensibility of 90%. The composition has a wet sieve retention value of 0.8%. The composition has a suspensibility of 85% under accelerated storage conditions. The composition also exhibited a wettability of 30 seconds. The water dispersible granules have almost no hardness.

Example 2: A water dispersible granular composition of Manganese oxide 1% and elemental sulphur 90% was prepared following the process steps as set forth in Example 1 where the composition includes 1 part of manganese oxide, 90 parts of elemental sulphur, 4 parts of naphthalene sulphonate condensate and 5 parts of phenyl naphthalene sulphonate. The composition had the following particle size distribution: D10 less than 2 microns; D50 less than 5 microns and D90 less than 20 microns.

The composition had a dispersibility of 80% and a suspensibility of 85%. The composition has a wet sieve retention value of 1%. The composition has a suspensibility of 80% under accelerated storage conditions. The composition also exhibited a wettability of 115 seconds. The granule size of the composition is in the range of 0.1-1.5 mm.

Example 3: A water dispersible granular composition of Manganese dioxide 70% and elemental sulphur 20% was prepared following the process steps as set forth in Example 1 where the composition includes 70 parts of manganese dioxide, 20 parts of elemental sulphur, 5 parts of naphthalene sulphonate condensate and 5 parts of china clay. The composition had the following particle size distribution: D10 less than 0.4 microns; D50 less than 3 microns and D90 less than 15 microns.

The composition had a dispersibility of 30% and a suspensibility of 30%. The composition has a wet sieve retention value of 1.9%. The composition has a suspensibility of 30% under accelerated storage conditions. The composition also exhibited a wettability of 40 seconds. The granule size of the composition is in the range of 0.1-2 mm. The water dispersible granules have almost no hardness.

Example 4: A water dispersible granular composition of Manganese carbonate 25% and elemental sulphur 50% was prepared following the process steps as set forth in Example 1 where the composition includes 25 parts of manganese carbonate, 50 parts of elemental sulphur, 5 parts of phenyl naphthalene sulphonate, 7 parts of sodium ligno sulphonate, 5 parts of precipitated silica and 8 parts of china clay.

The composition had the following particle size distribution: D10 less than 0.6 microns; D50 less than 2 microns and D90 less than 17 microns. The granule size of the composition is in the range of 0.1-0.5 mm.

The composition had a dispersibility of 55% and a suspensibility of 65%. The composition has a wet sieve retention value of 1.3%. The composition had a suspensibility of 65% under accelerated storage conditions. The composition also exhibited a wettability of 60 seconds.

Example 5: A water dispersible granular composition of Manganese dioxide 45%, elemental sulphur 30% was prepared following the process steps as set forth in Example 1 where the composition includes 45 parts of manganese dioxide, 30 parts of elemental sulphur, 10 parts of phenyl naphthalene sulphonate, and 15 parts of china clay. The composition had the following particle size distribution: D10 less than 3 microns; D50 less than 5 microns and D90 less than 11 microns. The granule size of the composition is in the range of 0.1-1.0 mm and the composition.

The composition had a dispersibility of 85% and a suspensibility of 95%. The composition has a wet sieve retention value of 0.6%. The composition has a suspensibility of 90% under accelerated storage conditions. The composition also exhibited a wettability of 5 seconds.

Example 6: A water dispersible granular composition of Manganese oxide 30%, elemental sulphur 35% and Thiamethoxam 4% was prepared following the process steps as set forth in Example 1 where the composition includes 30 parts of manganese oxide, 35 parts of elemental sulphur, 4 parts of thiamethoxam, 15 parts of phenyl naphthalene sulphonate, and 16 parts of precipitated silica. The composition had the following particle size distribution: D10 less than 1 microns; D50 less than 4.5 microns and D90 less than 10 microns. The granule size of the composition is in the range of 0.1-1.5 mm.

The composition had a dispersibility of 75% and a suspensibility of 80%. The composition has a wet sieve retention value of 0.2%. The composition had a suspensibility of 75% under accelerated storage conditions. The composition also exhibited a wettability of 15 seconds. The water dispersible granules have almost no hardness.

B. Liquid Suspension Compositions of Manganese and Elemental Sulphur

Example 7: Liquid Suspension composition was prepared by mixing 1 part of Manganese oxide, 60 parts of Elemental sulphur, 15 parts of naphthalene sulfonate condensate, 0.2 parts of formaldehyde, 1 part of polydimethylsiloxane, and 22.4 parts of propylene glycol and homogenised by feeding these ingredients into a vessel equipped with a stirrer to obtain a homogeneous mixture. The mixture obtained was passed through a suitable wet milling equipment to obtain a suspension with particle size of less than 20 microns. Then, 0.4 parts of gum arabic was added under continuous homogenization to obtain the liquid suspension composition. The composition had the particle size distribution of about D10 less than 1.2 microns; D50 less than 4.2 microns and D90 less than 10 microns.

The sample had a suspensibility of about 95% and a viscosity of about 500 cps. The sample exhibits a suspensibility of 90% under accelerated storage conditions and had a wet sieve retention value of 0.5%

Example 8: Liquid suspension composition was prepared by following the same process steps as put forth in Example 7, whereby the composition includes 15 parts of Manganese chloride, 40 parts of Elemental sulphur, 10 parts of napthalene sulfonate condensate, 2 parts of sodium alkyl naphthalene sulphonate blend, 0.2 parts of 1,2-benzisothiazolin-3-one, 1 part of polydimethylsiloxane, 4.2 parts of gum arabic and 27.6 parts of water. The composition had the particle size distribution of about D10 less than 0.7 microns; D50 less than 3 microns and D90 less than 12 microns.

The sample had suspensibility of about 75% and a viscosity of about 375 cps. The sample exhibits a suspensibility of 70% under accelerated storage conditions and had a wet sieve retention value of 1%

Example 9: Liquid suspension composition was prepared by following the same process steps as put forth in Example 7, whereby the composition included 45 parts of Manganese dioxide, 5 parts of elemental sulphur, 9 parts of phenyl naphthalene sulphonate, 4 parts of sodium alkyl naphthalene sulphonate blend, 18 parts of glycerol, 0.2 parts of formaldehyde, 1 part of gum arabic and 17.8 parts of propylene glycol. The mixture obtained was passed through a suitable wet milling equipment to obtain a suspension with a particle size of less than 50 microns. The composition had the particle size distribution of about D10 less than 1.2 microns; D50 less than 5 microns and D90 less than 17 microns.

The sample had suspensibility of about 30% and a viscosity of about 800 cps. The sample exhibits a suspensibility of 25% under accelerated storage conditions and had a wet sieve retention value of 1.5%

Example 10: Liquid suspension composition was prepared by following the same process steps as put forth in Example 7, whereby the composition included 35 parts of Manganese nitrate, 1 part of elemental sulphur, 15 parts of naphthalene sulphonate condensate, 11 parts of glycerol, 0.2 parts of 1,2-benziosothiazolin-3-one and 0.5 parts of carboxymethylcellulose and 37.3 parts of water. The composition had the particle size distribution of about D10 less than 0.6 microns; D50 less than 2.5 microns and D90 less than 15 microns.

The sample had a suspensibility of about 70% and a viscosity of about 1200 cps. The sample exhibits a suspensibility of 60% under accelerated storage conditions and had a wet sieve retention value of 1.5%

Example 11: Liquid suspension composition was prepared by following the same process steps as put forth in Example 7, whereby the composition included 50 parts of Manganese oxide, 4 parts of elemental sulphur, 6 parts of phenyl naphthalene sulphonate, 6 parts of sodium alkyl naphthalene sulphonate blend, 0.5 parts of carboxymethylcellulose and 28.5 parts of water. The composition had the particle size distribution of about D10 less than 1 micron; D50 less than 3.5 microns and D90 less than 13 microns.

The sample had a suspensibility of about 45% and a viscosity of about 100 cps. The sample exhibits a suspensibility of 40% under accelerated storage conditions and had a wet sieve retention value of 1.2%

Example 12: Liquid suspension composition was prepared by following the same process steps as put forth in Example 7, whereby the composition included 12 parts of Manganese dioxide, 30 parts of elemental sulphur, 8 parts of thiamethoxam, 16 parts of naphthalene sulphonate condensate, 8 parts of sodium alkyl naphthalene sulphonate blend, 0.3 parts of 1,2-benziosothiazolin-3-one and 1 part of carboxymethylcellulose and 24.7 parts of water. The composition had the particle size distribution of about D10 less than 0.3 microns; D50 less than 3.5 microns and D90 less than 20 microns.

The sample had a suspensibility of about 80% and a viscosity of about 650 cps. The sample exhibits a suspensibility of 75% under accelerated storage conditions and had a wet sieve retention value of 0.8%

Field Study

Field studies were carried out to assess the synergistic effect of different formulation of elemental Sulphur and Manganese dioxide in different formulations including water dispersible granules and suspension concentrations, as per the embodiment of the present invention, in Soybean.

Experiment No. 1

Field Experiment Methodology

The field trials were carried out to see the effect of different formulations of Sulphur+Manganese dioxide on yield, in commercially cultivated Soybean field at Devas, Indore.

The trial was laid out during the kharif season in Randomized Block Design (RBD) with six treatments including untreated control, replicated four times. For each treatment, plot size of 40 sq.m (8 m×5 m) was maintained. The compositions evaluated included Sulphur and Manganese dioxide alone and different formulations including combination of Sulphur and Manganese dioxide, where sulphur and manganese were applied in each treatment at same dosages. The compositions were applied as basal application, at the time of sowing of the Soybean crop. The Soybean crop under the field trial, was raised following good agricultural practices. The seed of Soybean, variety JS-335, was used for the study and planted in 30 cms row to row and 10 cms plant to plant spacing.

Details of the Experiment a) Trial Location: Devas, Indore (MP)
b) Crop: Soybean (var: JS 335)
c) Experiment season: Kharif 2018
d) Trial Design: Randomized Block Design
e) Replications: Four
f) Treatment: Six
g) Plot size: 8 m×5 m=40 sq.m
h) Date of Application: 1 Jul. 2018
i) Date of sowing: 3 Jul. 2018
j) Method of application: Basal
k) Date of Harvesting: 8 Oct. 2018

The observation on the soybean grain yield was recorded at the time of harvesting and the mean data was presented in Table 1 to enumerate the impact of the combination of sulphur and Manganese dioxide, both alone and in combination in different formulation types on the yield of Soybean.

TABLE 1

Efficacy of combination of sulphur and manganese dioxide on soyabean

| Treatment details | Dose of nutrient salt in g/acre | | Grain Yield (kg/acre) | Expected % yield increase |
|---|---|---|---|---|
| | Sulphur | Manganese | | |
| T1-Untreated | — | — | 985.3 | — |
| T2-Manganese dioxide 25% granules | — | 790 | 1131.6 (14.8)* | — |
| T3-90% Sulphur water dispersible granules | 2000 | — | 1152.5 (17.0) | — |
| T4-40% Sulphur + 25% Manganese dioxide (Mn −15.8%) water dispersible granules as per the embodiment of the invention | 2000 | 790 | 1308.8 (32.8) | 29.3 (1.12)** |
| T5-40% Sulphur + 25% Manganese dioxide (Mn −15.8%) Pastilles | 2000 | 790 | 1184.7 (20.2) | 29.3 (0.69) |
| T6- 20% Sulphur + 12.5% Manganese dioxide (Mn −7.9%) suspension concentrate as per the embodiment of the invention | 2000 | 790 | 1296.1 (31.5) | 29.3 (1.08) |

*% yield increase over untreated
**Synergy factor

The action expected for a given combination of two active components can be calculated as follows:

$$E = X + Y - (XY/100)$$

Where,
E=Expected % effect by mixture of two products X and Y in a defined dose.
X=Observed % effect by product A
Y=Observed % effect by product B The synergy factor (SF) is calculated by Abbott's formula (Eq.(2)(Abbott, 1925).

SF=Observed effect/Expected effect

Where, SF>1 for Synergistic reaction; SF<1 for antagonistic reaction; SF=1 for additive reaction.

When the percentage of yield effect observed for the combination is equal to the expected percentage, merely an additive effect may be inferred, and wherein the percentage of yield effect observed for the combination is lower than the expected percentage, an antagonistic effect of the combinations can be inferred. The term "synergy" is defined by Colby S. R. in an article entitled "*Calculation of the synergistic and antagonistic responses of herbicide combinations*" published in Weeds, 1967, 15, p. 20-22. When the percentage of yield effect observed (E) for the combination is greater than the expected percentage, synergistic effect of the combination can be inferred.

It can be seen from the above table that the expected percentage increase in the yield, with the composition of Sulphur plus manganese salt in combination is found to be 29.3%, as calculated by the Abott's formula.

It can be further seen from the data in Table 1, that the compositions of T4—with water dispersible granules and T6 with suspension concentrate, as per the embodiments of the present invention, demonstrated a synergistic behavior.

It can be clearly seen from the Table 1 above, that the treatment T4 with Sulphur 40%+25% Manganese dioxide (Mn −15.9%) water dispersible granular composition, as per the embodiment of the present invention and the treatment T6 with Sulphur 20%+12.5% Manganese dioxide (Mn −7.95%) SC, as per the embodiment of the present invention showed a 32.8% and 31.5% increase in the soybean grain yield, respectively, as compared to the untreated control. Thus, the water dispersible granular composition and the liquid suspension composition, both in accordance with the present invention, showed a surprising synergy and enhanced efficacy, as compared to treatments T2 and T3 with individual actives and or in comparison with treatment T5 with Sulphur 40%+25% Manganese dioxide (Mn −15.9%) pastilles, known in the art. In fact, treatment T4 with water dispersible granular composition and Treatment T6 with Sulphur 20%+12.5% Manganese dioxide (Mn −7.95%) SC, both as per the embodiment of the present invention, showed a surprising 10.47% and 9.4% increase, respectively in the grain yield of soybean, as compared to the treatment T5 with Sulphur −40%+25% Manganese dioxide (Mn −15.9%) pastille composition.

Experiment No 2

Field trial to assess the impact of different formulations of Sulphur (S)+various Manganese salts, at different concentrations on the carbohydrate content in leaves, pod numbers, test weight, yield and oil percentage in Soybean.

The effect of the combination of Sulphur and Manganese in different concentrations and different forms, including water dispersible granules and suspension concentrates, both as per the embodiment of the present invention, was assessed by field trial experiment in commercially cultivated Soybean field at Saver, Ujjain (MP) for carbohydrate content in leaves, pod numbers, test weight, yield and oil contents.

The trials were laid out during kharif season in Randomized Block Design (RBD) with ten treatments including untreated control, replicated thrice. For each treatment, plot size of 35 sq.m (7 m×5 m) was maintained. The samples evaluated included combinations of Sulphur and various Manganese salts in varying concentrations and specific dosages, where the treatments were applied as basal application at the time of sowing of the Soybean crop. The Soybean crop in trial field was raised following good agricultural practices. The seed of Soybean, variety JS-335, were used for the study and planted in 30 cms row to row and 10 cms plant to plant spacing.

Details of Experiment a) Trial Location: Saverr, Ujjain (MP)
b) Crop: Soybean (var: JS 335)
c) Experiment season: Kharif 2018
d) Trial Design: Randomized Block Design
e) Replications: Three
f) Treatment: Ten
g) Plot size: 7 m×5 m=35 sq.m
h) R×P spacing: 30 cm×10 cm
i) Date of Application: 28 Jun. 2018
j) Date of sowing: 29 Jun. 2018
k) Method of application: Basal
l) Date of Harvesting: 11 Oct. 2018

The observation on different parameters of yield and yield attributing factors in soybean viz, carbohydrate content in leaves, pod numbers, test weight, yield and oil contents, were recorded at the time of harvesting and the mean data was presented in Table 2, to enumerate the impact of different formulations of combination of sulphur and manganese salts in varying concentrations.

TABLE 2

Effect of combination of sulphur and various manganese salts in different forms including water dispersible granules and suspension concentrate, as per the present invention, at different concentrations.

| Treatment details | Dose of nutrient salt in g/acre | | Soluble Carbohydate content in Leaves (mg g-1 dry wt.) | Av. Number of pods/ plant | 1000 grain wt (g) | Grain yield (kg/acre) | % oil content |
| --- | --- | --- | --- | --- | --- | --- | --- |
| | S | Mn | | | | | |
| T1-Sulphur 80% + Manganese 7.74% (10% Manganese oxide) water dispersible granules as per embodiment of the invention | 4000 | 387 | 9.12 (53.8)* | 22.3 (32.0) | 113.2 (0.3) | 1344.2 (27.7) | 19.5 (4.8) |
| T2-Sulphur 40% + Manganese 15.9% (25% Manganese dioxide) water dispersible granules as per embodiment of the invention | 2000 | 790 | 10.34 (74.4) | 24.7 (46.2) | 116.7 (3.4) | 1452.6 (38.0) | 20.2 (8.6) |
| T3-Sulphur 45% + Manganese 6.14% (20% Manganese nitrate) water dispersible granules as per embodiment of the invention | 2250 | 307 | 10.11 (70.5) | 23.5 (39.1) | 115.2 (2.0) | 1399.8 (32.9) | 19.7 (5.9) |
| T4- Sulphur 80% + Manganese 7.74% (10% Manganese oxide) Pastilles | 4000 | 387 | 6.82 (15.0) | 18.8 (11.2) | 114.3 (1.2) | 1187.2 (12.8) | 18.9 (1.6) |
| T5- Sulphur 40% + Manganese 15.9% (25% Manganese dioxide) pastilles granules | 2000 | 790 | 7.75 (30.7) | 19.5 (15.4) | 115.7 (2.5) | 1193.4 (13.3) | 19.1 (2.7) |
| T6- Sulphur 45% + Manganese 6.14% (20% Manganese nitrate) Pastilles | 2250 | 307 | 7.80 (31.5) | 17.9 (5.9) | 113.1 (0.2) | 1156.8 (9.9) | 19.0 (2.2) |

TABLE 2-continued

Effect of combination of sulphur and various manganese salts in different forms including water dispersible granules and suspension concentrate, as per the present invention, at different concentrations.

| Treatment details | Dose of nutrient salt in g/acre | | Soluble Carbohydate content in Leaves (mg g-1 dry wt.) | Av. Number of pods/ plant | 1000 grain wt (g) | Grain yield (kg/acre) | % oil content |
|---|---|---|---|---|---|---|---|
| | S | Mn | | | | | |
| T7- Sulphur 40% + Manganese 3.87% (5% Manganese oxide) suspension concentrate, as per embodiment of the invention | 4000 | 387 | 10.03 (69.1) | 23.1 (36.7) | 114.2 (1.2) | 1401.3 (33.1) | 19.7 (5.9) |
| T8 - Sulphur 20% + Manganese 7.95% (12.5% Manganese dioxide) suspension concentrate, as per embodiment of the invention | 2000 | 790 | 10.12 (70.7) | 24.3 (43.8) | 116.3 (3.0) | 1442.7 (37.0) | 20.0 (7.5) |
| T9- Sulphur 22.5% + Manganese 3.07% (10% Manganese nitrate) as per embodiment of the invention | 2250 | 307 | 10.04 (69.3) | 24.0 (42.0) | 113.4 (0.4) | 1382.5 (31.3) | 19.8 (6.5) |
| T10-Untreated | — | — | 5.93 (−) | 16.9 (−) | 112.9 (−) | 1052.9 (−) | 18.6 (−) |
| CD at (0.05%) | — | — | 1.27 | 2.31 | NS | 138.4 | 0.71 |

% Increase or Decrease Over Control

It was observed from the above table that Treatments T1, T2 and T3 with varying concentrations of sulphur and manganese in water dispersible granular forms, as per the embodiment of the present invention and treatment T7, T8, T9 in suspension concentrate form also as per the embodiment of the present invention, showed a significant increase in the soluble carbohydrate content in leaves of soybean plant, grain yield, oil content as compared to the pastilles and the untreated plants.

It was observed that on comparing treatments T1, T4, T7, treatment T1 with Sulphur 80%+Manganese 7.74% (10% Manganese oxide) water dispersible granules and T7 with Sulphur 40%+Manganese 3.87% (5% Manganese oxide) suspension concentrate, both as per the embodiment of the invention, depicted a 53.8% and 69.1% increase, in the soluble carbohydrate content, respectively, over the untreated control, as compared to the treatment T4 with Sulphur and Manganese dioxide pastilles, which only showed about 15% increase in the carbohydrate content in the leaves, over the untreated control. It can be noted that in each of the above treatment, same amount of sulphur and manganese were being applied.

Further, treatment T2, T8 with compositions as per the embodiment of the invention, showed an increase in the soluble carbohydrate content by 74.4% and 70.7% respectively, whereas treatment T5 with the pastille composition showed only a 30% increase in the carbohydrate content in the soybean leaves.

Furthermore, treatment T1, T2, T3, T7, T8, and T9 with compositions as per the present invention, showed a significantly higher grain yield of soybean, and an increased oil content as compared to treatments T4, T5 and T6. For instance, on comparing treatment T2, T5, treatment T2 and T8 with compositions as per the embodiment of the invention showed about 38% and 37% increase in the grain yield, respectively, as compared to treatment T5 which demonstrated about 13.3% yield increase, as compared to the untreated control. Further, the oil content with the treatments T2, T8 was 8.6% and 7.5% higher, respectively, as compared to the untreated control, whereas the treatment T5 with the pastille composition, showed an oil content increase of only 2.7% over the untreated control.

Also, on comparing treatment T3, T6, T9, treatments T3 and T9 with the compositions, as per the present invention, demonstrated a yield increase of about 32.9% and 31.3%, respectively, as compared to the treatment T6 which showed a yield increase of only 9.9% over the untreated control. The results are particularly surprising as each treatments T1, T4 and T7 has the same amount of sulphur and manganese being applied. Further the treatments T2, T5 and T8 also had the same dose of sulphur and manganese, that was applied.

Thus, the combination of sulphur and various manganese salts at different concentrations in the form of water dispersible granules and suspension concentrates as per the embodiments of the present invention, demonstrated a significant enhancement in the yield, as well as the soluble carbohydrate content, and oil content in soyabean, as compared to the treatments with sulphur and manganese salts in pastille form, particularly when sulphur and manganese are applied at the same dosages of application.

Experiment 3: To Study the Effect of Sulphur and Manganese Dioxide in Various Forms, Including Composition as Per the Present Invention, on the Carbohydrate Content in Soybean The observations on carbohydrate content in soybean leaves was also assessed at 50 days sowing of the soybean crop by taking the samples from all the treated plots and the mean data is presented in form of Graph 1 (The FIGURE) to see the effect of different formulation of Sulphur (S)+ Manganese dioxide (Mn) combination on the improvement in carbohydrate content in the soybean leaves.

The treatment details are as follows:
T1—Untreated;
T2—Manganese dioxide 25% granules @ 790 g/acre Mn;
T3—Sulphur 90% WDG @ 2000 g/acre S;
T4—Sulphur 40%+Manganese dioxide 25% (Mn −15.9%) WDG @ 2000 g/acre S+790 g/acre Mn;
T5—Sulphur −40%+25% Manganese dioxide (Mn −15.9%) Pastilles @ 2000 g/acre S+790 g/acre Mn;
T6—Sulphur −20%+12.5% Manganese oxide (Mn −7.95%) SC @ 2000 g/acre S+790 g/acre Mn;

The expected percentage increase in the carbohydrate content is calculated using the Colby's method as follows:

$$E = X + Y - (XY/100)$$

Where,
E=Expected % effect by mixture of two products X and Y in a defined dose.
X=Observed % effect by product of Treatment T2 (21.13%)
Y=Observed % effect by product of Treatment T3 (18.01)

Based on The FIGURE and the calculations made, the expected carbohydrate content in the soybean leaves was found to be 35.3 mg/gm. It was further observed that treatments T4 with Sulphur 40%+Manganese dioxide 25% (Mn −15.9%) water dispersible granules @ 2000 g/acre S+790 g/acre Mn; and T6 with Sulphur −20%+12.5% Manganese oxide (Mn-7.95%) suspension concentrates @ 2000 g/acre S+790 g/acre Mn; respectively, both as per the embodiments of the present invention, showed a 80.1% and 74.55% increase in the carbohydrate content, in the soybean leaves, over the untreated control. Furthermore, Treatment T5 with Sulphur plus Manganese dioxide pastille composition where same amount of sulphur and manganese was applied, only showed an increase of 21.88% in the carbohydrate content, over the untreated control. The compositions of treatments T4 and T6 with compositions as per the present invention thus exhibited a synergistic effect as compared to the composition of treatment T5 with Sulphur and manganese dioxide pastilles. The graph demonstrates that the compositions as per the embodiments of the present invention exhibits synergistic effect over that of compositions known in the art, namely pellets/pastilles.

Experiment 4: To Study the Effect of Sulphur and Manganese Oxide Water Dispersible Granular Compositions and Liquid Suspension Composition in Varying Concentrations on Wheat Crop Field trials were carried out to study the synergistic effect of different formulations of Sulphur+Manganese oxide, in varying concentrations, on the yield in commercial cultivated wheat field at Karnal, Haryana.

Field Experiment Methodology

The trial was laid out during the Rabi season in Randomized Block Design (RBD) with six treatments including untreated control, replicated four times. For each treatments, plot size of 40 sq.m (8 m×5 m) was maintained. The trials were carried out with Sulphur and Manganese oxide applied alone, as well as in combination, in different formulations and at varying concentrations, applied as basal application, at the time of sowing of the wheat crop. The wheat crop in the trial field was raised followed good agricultural practices. The seed of Wheat, variety PBW 343, were used for the study and planted in 30 cms, row to row and 10 cms, plant to plant spacing.

Details of Experiment a) Trial Location: Sikar, Rajasthan
b) Crop: Wheat (var: PBW 343)
c) Experiment season: Rabi 2018-19
d) Trial Design: Randomized Block Design
e) Replications: Four
f) Treatment: Six
g) Plot size: 8 m×5 m=40 sq.m
h) Date of Application: 1 Nov. 2018
i) Date of sowing: 2 Nov. 2018
j) Method of application: Basal
k) Date of Harvesting: 1 Apr. 2019

The observations on the wheat grain yield was recorded at the harvest time and mean data was presented in Table 3, to enumerate the impact of the combination of Sulphur and Manganese oxide, applied alone as well as in combination, in different formulations at varying concentrations on wheat yield.

TABLE 3

| Treatment details | Dose of nutrient salt in g/acre | | Actual Grain Yield (kg/acre) | Expected % yield increase |
|---|---|---|---|---|
| | Sulphur | Manganese | | |
| T1-Untreated | — | — | 1822.6 | — |
| T2-Manganese oxide 25% granules | — | 1327.42 | 2123.5 (16.5)* | — |
| T3-Sulphur 90% water dispersible granules | 2000 | — | 2056.3 (12.8) | — |
| T4-Sulphur −35% + 30% Manganese oxide (Mn −23.23%) water dispersible granules as per the present invention | 2000 | 1327.42 | 2415.4 (32.5) | 27.2 (1.20)** |
| T5- Sulphur −35% + 30% Manganese oxide (Mn −23.23%) Pastilles | 2000 | 1327.42 | 2207.8 (21.1) | 27.2 (0.78) |
| T6- Sulphur −17.5% + 15% Manganese oxide (Mn −11.615%) suspension concentrate as per the present invention | 2000 | 1327.42 | 2398.5 (31.6) | 27.2 (1.16) |

*% yield increase over untreated
**Synergy factor

It can be seen from the above table that the expected percentage increase in the yield of wheat, as calculated by the Abbott's formula, with the composition of Sulphur plus manganese salt in combination is found to be 27.2%.

It can be clearly seen from the Table 3 above, that the treatment T4 with Sulphur −35%+30% Manganese oxide (Mn −23.23%) water dispersible granules, as per the embodiment of the present invention and the treatment T6 with Sulphur −17.5%+15% Manganese oxide (Mn −11.615%) suspension concentrate, as per the embodiment of the present invention showed a synergistic effect and a surprising enhancement in the grain yield of wheat, as compared to the treatment T5 with Sulphur −35%+30% Manganese oxide (Mn −23.23%) pastilles, when the compositions in each of the above treatments had the same does of sulphur and manganese being applied. In fact treatments T4 and T6 with compositions, as per the embodiment of the present invention, showed a 32.5% and 31.6% increase in the grain yield of wheat, over the untreated control, as compared to the treatment T5 with pastilles of Sulphur plus Manganese, which only showed a 21.1% increase over the untreated control. Thus the compositions of the present invention show surprisingly enhanced efficacy over the treatments with individual application of sulphur and manganese or as compared to the treatments with sulphur plus manganese pastille compositions.

Experiment 5: Field Trials were Carried Out to Study the Impact of Different Formulation of Sulphur (S) and Various Manganese Salts at Different Concentration, on Commercially Cultivated Wheat Field at Nasik, Maharashtra, to Assess Parameters Such as the Number of Tillers, Test Weight and Grain Yield Field Experiment Methodology The trials were laid out during the rabi season in Randomized Block Design (RBD) with ten treatments including untreated control, replicated thrice. For each treatment, plot size of 35 sq.m (7 m×5 m) was maintained. The trial samples of Sulphur and various manganese salts such as manganese oxide, manganese dioxide and manganese nitrate, were applied in combination, in different formulations, at varying concentrations as basal application at the time of sowing of the wheat crop. The wheat crop in the field trial, was raised following good agricultural practice. The seed of Wheat, variety Kranti, were used for the study and planted in 30 cms row to row and 10 cms plant to plant spacing.

Details of Experiment a) Trial Location: Nasik (Maharashtra)
b) Crop: Wheat (var: Kranti)
c) Experiment season: Rabi 2018-19
d) Trial Design: Randomized Block Design
e) Replications: three
f) Treatment: ten
g) Plot size: 7 m×5 m=35 sq.m
h) R×P spacing: 30 cm×10 cm
h) Date of Application: 12 Nov. 2018
i) Date of sowing: 14 Nov. 2018
j) Method of application: Basal
k) Date of Harvesting: 28 Mar. 2019

The observation on different parameters of yield and yield attributing factors viz.

number of tillers, test weight, and grain yield, in wheat, were recorded at the time of harvesting and the mean data was presented in Table 4 to enumerate the impact of different formulations of the combination of sulphur and Manganese in varying concentrations.

TABLE 4

| Treatment details | Dose of nutrient salt in g/acre | | Average number of effective tillers | Test wt (g) | Grain yield (kg/acre) |
|---|---|---|---|---|---|
| | Sulphur | Manganese | | | |
| T1-Sulphur −70% + Mn −9.59% (15% Manganese dioxide) water dispersible granules as per the embodiment of the present invention | 4000 | 548 | 11.9 (15.5) | 42.1 (5.0) | 2088.5 (22.2) |
| T2-Sulphur 35% + Mn −23.22% (30% Manganese oxide) water dispersible granules as per the embodiment of the present invention | 2000 | 1326.79 | 12.8 (24.3) | 43.7 (9.0) | 2152.3 (25.9) |
| T3-Sulphur −35% + Mn −13.138% (30% Manganese chloride) water dispersible granules as per the embodiment of the present invention | 1400 | 525.52 | 12.1 (17.5) | 42.8 (6.7) | 2034.7 (19.0) |
| T4- Sulphur −70% + Mn −9.59% (15% Manganese dioxide) pastilles | 4000 | 548 | 10.8 (4.9) | 40.6 (1.2) | 1811.9 (6.0) |
| T5-Sulphur 35% + Mn −23.22% (30% Manganese oxide) pastilles | 2000 | 1326.79 | 11.2 (8.7) | 41.3 (3.0) | 1901.3 (11.2) |

TABLE 4-continued

| Treatment details | Dose of nutrient salt in g/acre Sulphur | Dose of nutrient salt in g/acre Manganese | Average number of effective tillers | Test wt (g) | Grain yield (kg/acre) |
| --- | --- | --- | --- | --- | --- |
| T6- Sulphur −35% + Mn −13.138% (30% Manganese chloride) pastilles | 1400 | 525.52 | 10.7 (3.9) | 41.1 (2.5) | 1852.5 (8.4) |
| T7-Sulphur 35% + Mn −4.73% (7.5% Manganese dioxide) suspension concentrates as per the embodiment of the invention | 4000 | 548 | 11.5 (11.7) | 42.3 (5.5) | 2045.4 (19.7) |
| T8-Sulphur 17.5% + Mn −11.61% (15% Manganese oxide) suspension concentrate as per the embodiment of the present invention | 2000 | 1326.79 | 12.3 (19.4) | 42.9 (7.0) | 2098.9 (22.8) |
| T9- Sulphur −17.5% + Mn −6.659% (15% Manganese chloride) suspension concentrates as per the embodiment of the invention | 1400 | 525.52 | 12.4 (20.4) | 42.5 (6.0) | 2084.5 (22.0) |
| T10-Untreated | — | — | 10.3 (−) | 40.1 (−) | 1709.3 (−) |
| CD at (0.05%) | — | — | 0.92 | 1.12 | 156.2 |

*% increase or decrease over untreated control

It was observed from the above table that Treatments T1, T2 and T3 with of sulphur and manganese in water dispersible granular forms, as per the embodiment of the present invention, showed a 22.2%, 25.9% and 19.0% increase in the yield of wheat plant as compared to the untreated plants, whereas the Treatments T7, T8 and T9 with sulphur and manganese in liquid suspension form, as per the embodiment of the present invention showed 19.7%, 22.8% and 22% increase, respectively, in the grain yield of wheat. On the other hand, it was observed that treatments with varying concentrations of Sulphur plus manganese in the pastille form (Treatments T6, T7 and T8), known in the art, showed only 6%, 11.2% and 8.4% increase, respectively, in the grain yield of wheat.

It was further observed that on comparing treatment T2, T5, T8, treatment T2 and T8 with water dispersible granules and liquid suspension as per the embodiment of the invention, depicted yield increase of about 25.9% and 22.8%, respectively whereas treatment T5 (prior art pastilles) showed a yield increase of only 11.2%, where sulphur and manganese were applied at equal doses in all the three treatments. Similarly on comparing treatment T3, T6, T9 it was observed that treatment T3 and T9, with water dispersible granules and liquid suspension composition, as per the embodiment of the inventions, showed a yield increase of about 19% and 22%, respectively, whereas T6 with the pastille composition of sulphur and manganese showed a yield increase of only 8.4%. Thus, combination of sulphur and manganese salts in water dispersible granular form and liquid suspension form, both as per the present invention, depicted significantly higher yield as compared to sulphur and manganese salt in pastille form. The results are particularly surprising as each treatments T1, T4 and T7 has the same dose of sulphur and manganese being applied. Further the treatments T2, T5 and T8 or the treatments T3, T6 and T9, each respectively, had the same dose of sulphur and manganese that was applied.

The composition of treatments T1, T2, T3, T7, T8 and T9, with water dispersible granules and suspension concentrates, both, as per the present invention also showed an enhancement in the average number of effective tillers as compared to treatments T4, T5 and T6 with compositions in the form of pastilles.

Experiment 6

Field studies were carried out to study impact of different formulations of Sulphur+Manganese dioxide on common scab disease (caused by *Streptomyces scabies*) control in Potato.

Field Experiment Methodology

The field trials were carried out to evaluate the effect of different formulations of Sulphur+Manganese dioxide on common scab disease (caused by *Streptomyces scabies*) control in Potato, at Devas in Indore. The trial was laid out during the Rabi season in Randomized Block Design (RBD) with six treatments including untreated control, replicated four times. For each treatment, plot size of 40 sq.m (8 m×5 m) was maintained. The compounds evaluated include Sulphur and Manganese dioxide alone and its combination in different formulations in prescribed dose, applied as basal application in furrow at the time of sowing of the Potato tubers. The potato crop in trial field was raised following good agricultural practices. The seed of potato variety Loker, were used for the study and planted in 60 cms row to row and 25 cms plant to plant spacing.

Details of Experiment a) Trial Location: Devas, Indore
b) Crop: Potato (var: Loker)
c) Experiment season: Rabi 2018
d) Trial Design: Randomized Block Design
e) Replications: Four f) Treatment: Six
g) Plot size: 8 m×5 m=40 sq.m
h) Date of sowing: 10 Nov. 2018
i) Date of Application: 10 Nov. 2018
j) Method of application: Basal in Furrow
k) Date of Harvesting: 18 Mar. 2019

The common scab disease incidence and tuber yield was recorded at harvest of the potato crop. A one row digger was used to harvest the crop and tubers were picked manually. After harvest, tubers were graded, and the number and weight of healthy and diseased tubers were recorded.

Common scab disease severity (DS) on each tuber was assessed based on the % of common scab symptoms on tuber surface area using a scale of 0-100% (Falloon et al., 2001).

The number of common scab infected tubers expressed as a percentage of the total number of tubers was considered as disease incidence (DI). Gross yield for each treatment was calculated based on the total average weight of tubers obtained from 4 replicate rows The mean data of common scab incidence and percent disease control is presented in Table 7.

TABLE 5

To assess the effect of different formulations including combination of Sulphur + Manganese dioxide against common scab in Potato:

| Treatment details | Dose of nutrient salt in g/acre | | Disease Incidence | | Potato tuber yield (t/acre) |
|---|---|---|---|---|---|
| | Sulphur | Manganese | % | % reduction | |
| T1-Untreated | — | — | 22.3 | — | 9.12 |
| T2-Manganese dioxide (known product) | — | 1096.57 | 14.7 | 34.1 | 11.42 |
| T3-Sulphur 90% water dispersible granules | 2000 | — | 15.9 | 28.7 | 11.95 |
| T4-Sulphur –35% + 30% Manganese dioxide (Mn –19.19%) water dispersible granules as per embodiment of the present invention | 2000 | 1096.57 | 9.1 | 59.2 | 13.04 |
| T5- Sulphur –35% + 30% Manganese dioxide (Mn –19.19%) Pastilles | 2000 | 1096.57 | 18.3 | 17.9 | 11.00 |
| T6- Sulphur 17.5% + 15% Manganese dioxide (Mn –9.59%) suspension concentrates as per embodiment of the present invention | 2000 | 1096.57 | 8.9 | 60.1 | 12.91 |
| CD at 0.05% | — | — | 4.32 | 11.26 | 1.43 |

The observation on disease incidence of common scab in potato caused by *Streptomyces scabies* was recorded and it was observed from the above table that the Treatment 4 with Sulphur 35%+30% Manganese dioxide (Mn –19.19%) water dispersible granules and Treatment 6 with Sulphur 17.5% Manganese dioxide (Mn –9.59%) suspension concentrate composition, both as per the embodiments of the present invention, showed a 59.1% and 60.1% reduction, respectively, in the disease incidence, as compared to the untreated control. In fact, the treatments 4 and 6, as per the embodiments of the invention were also far superior to the control exhibited by Treatment 5 with Sulphur 35%+30% Manganese dioxide (Mn –19.19%) pastilles, or as compared to Treatments T2 and T3 with individual actives. Also the treatments with compositions as per the embodiment of the invention, exhibited a significant enhancement in the yield of the potato tubers, as compared to the untreated control or as compared to Treatments with individual actives or the pastille composition in potato.

Experiment 7: Field Studies were Carried Out to Assess the Impact of Different Range of Particle Size of the Composition of Sulphur (S)+Manganese Dioxide (Mn) on the Yield of Soybean at Nasik, Maharashtra Field Experiment Methodology The trial was laid out during kharif season in Randomized Black Design (RBD) with five treatments including untreated control, replicated four times. For each treatments, plot size of 40 sq.m (8 m×5 m) was maintained. The compositions tried included Sulphur 40% and 25% Manganese dioxide (Mn –15.8%) water dispersible granules in varying particle size range, including composition as per the embodiment of the present invention. The compositions with prescribed dose were applied as basal application at time of sowing of soybean seed. The Soybean crop in trial field was raised following good agricultural practice. The seed of Soybean, variety JS 9041, were used for sowing in 40 cm row to row and 15 cm plant to plant spacing.

Details of Experiment a) Trial Location: Nasik, Maharashtra
b) Crop: Soybean (var: JS 9041)
c) Experiment season: Kharif 2018
d) Trial Design: Randomized Block Design
e) Replications: Four
f) Treatment: 5
g) Plot size: 8 m×5 m=40 sq.m
h) Date of transplanting: 8 Jul. 2018
i) Date of Application: 7 Jul. 2018
j) Method of application: Basal application
k) Date of Harvesting: 12 Oct. 2018

The observation on yield was recorded at the time of harvesting and mean data is presented in table 6 to see the impact of different treatments on the grain yield of Soybean

TABLE 6

| Treatment details | Range of particle size of composition | Formulation dose (kg/acre) | Dose of nutrient salt in g/acre | | Average no of pods/ plant* | Grain yield (q/acre) | % Yield increase over untreated |
|---|---|---|---|---|---|---|---|
| | | | Sulphur | Manganese | | | |
| T1-Untreated | — | — | — | — | 21.5 | 9.07 | — |
| T2- Sulphur 40% + 25% Manganese dioxide (Mn –15.8%) water dispersible granules as per embodiment of the invention | 0.1 to 20 micron | 5.0 | 2000 | 790 | 29.3 | 12.08 | 33.2 |
| T3- Sulphur 40% + 25% Manganese dioxide (Mn –15.8%) water dispersible granules | 0.1 to 50 micron | 5.0 | 2000 | 790 | 25.9 | 11.00 | 21.3 |
| T4- Sulphur 40% + 25% Manganese dioxide (Mn –15.8%) water dispersible granules | 20 to 50 micron | 5.0 | 2000 | 790 | 25.2 | 10.87 | 19.8 |
| T5- Sulphur 40% + 25% Manganese dioxide (Mn –15.8%) water dispersible granules | 50 to 100 micron | 5.0 | 2000 | 790 | 23.4 | 10.10 | 11.4 |
| CD (P > 0.05) | — | — | — | — | 2.09 | 0.63 | — |

It can be seen from the data presented in Table 6 that Treatment T2 with Sulphur 40%+25% Manganese dioxide (Mn –15.8%) water dispersible granules, with particle size in the range of 0.1 micron to 20 microns, as per the embodiment of the present invention, showed a significant increase in the grain yield and the average number of pods per plant, when compared to treatment T3 with Sulphur 40%+25% Manganese dioxide (Mn –15.8%) water dispersible granules, having particle size in the range of 0.1 to 50 microns, or treatment T4 with Sulphur 40%+25% Manganese dioxide (Mn –15.8%) water dispersible granules, having particle size in the range of 20 to 50 microns and treatment T5 with Sulphur 40%+25% Manganese dioxide (Mn –15.8%) water dispersible granules, having particle size in the range of 50 to 100 microns. It was observed that the Treatment T2 with composition as per the present invention showed a surprisingly significant 33.2% increase in the grain yield as compared to the untreated control whereas the treatments T3, T4 and T5 only showed a yield increase of 21.3%, 19.8% and 11.4%, respectively, as compared to the untreated control. It was noted that enhancement in efficacy was observed with the water dispersible granular formulation, as per the present invention, where the composition comprised particles in the size range of 0.1 micron-20 microns, as compared to the water dispersible granular formulations with higher particle size ranges.

Experiment 8: Field Studies were Carried Out to Study the Effect of Different Formulations of Sulphur and Manganese on Yield of Potato.

Field Experiment Methodology

The field trials were carried out to see the effect of different formulations of Sulphur and Manganese in different dosages of the active, singly and in combinations as per the embodiment of the present invention, on the yield in commercially cultivated potato at Nashik, Maharashtra.

The trial was laid out during the Rabi season in Randomized Block Design (RBD) with five treatments including untreated control, replicated four times. For each treatment, plot size of 40 sq.m (8 m×5 m) was maintained. The samples evaluated included Sulphur and Manganese dioxide alone and its combination in different formulations in prescribed dose, applied as basal application at the time of sowing of the Potato tubers. The potato crop in trial field was raised following good agricultural practices. The tubers were planted in 60 cms row to row and 25 cms plant to plant spacing. The observation on tuber yield was recorded at the time of harvesting and mean data of all observations were presented in tables 7 to enumerate the impact the combination of sulphur and manganese on tuber yield.

Details of Experiment a) Trial Location: Nashik, Maharashtra
b) Crop: Potato
c) Experiment season: Rabi 2018
d) Trial Design: Randomized Block Design
e) Replications: Four
f) Treatment: Six
g) Plot size: 8 m×5 m=40 sq.m
h) Date of sowing: 25 Oct. 2018
i) Date of Application: 24 Oct. 2018
j) Method of application: Basal in Furrow
k) Date of Harvesting: 25 Jan. 2019

TABLE 7

To assess the effect of different formulation combination of Sulphur and Manganese on yield of potato

| Treatment details | Dose of nutrient salt in g/acre | | Tuber yield (q/acre) | % yield increase over untreated |
| --- | --- | --- | --- | --- |
| | Sulphur | Manganese | | |
| T1-Untreated | — | — | 117.5 | 0 |
| T2-Sulphur 40% + Manganese 15.9% (25% Manganese dioxide) water dispersible granules as per embodiment of the invention | 2000 | 790 | 138.2 | 17.61 |
| T3 - Sulphur 20% + Manganese 7.9% (12.5% Manganese dioxide) suspension concentrate, as per embodiment of the invention | 2000 | 790 | 135.6 | 15.40 |
| T4-Manganese sulphate (Mn: 30.5%) | — | 1525 | 122.3 | 4.08 |
| T5- Sulphur 90% water dispersible granules | 2750 | — | 124.2 | 5.70 |

It was observed from the above table that Treatment 2 with Sulphur 40%+Manganese 15.9% (25% Manganese dioxide) water dispersible granules as per embodiment of the invention and Treatment 3 with Sulphur 20%+Manganese 7.9% (12.5% Manganese dioxide) suspension concentrate, as per embodiment of the invention, showed a significant enhancement in the potato tuber yield over the untreated control, as compared to treatment T4 with commercially available manganese sulphate or as compared to Sulphur 90% WDG. Treatments T1 and T2 depicted yield increase of about 17.6% and 15.4% at reduced dosage of actives being applied, when compared to treatment T3 (commercially available) which showed yield increase of only 4.08% and treatment T4 (commercially available) which showed yield increase of only 5.70%. Thus, it can be concluded that even at reduced dosage, the combination of elemental sulphur and Manganese dioxide (treatment T2 and T3) in the form of water dispersible granules and suspension concentrate, as per the embodiments of the present invention, showed a significant improvement in the potato tuber yield, than those of the treatment with individual actives (treatments T4, T5).

Further, the inventors of present invention also tested the combination of elemental sulphur and manganese salts with fertilizer or other micronutrients on certain crops like tomato and grapes. It was observed that addition of other micronutrients such as boron salts, to the combination of the present invention may further enhance crop characteristics like greenness, fruit weight, plant height and add to nutritional value of the crop. Further such combinations may additionally help in improving the crop yield, improved photosynthesis, increase chlorophyll content and uptake of other nutrients by the crop.

Thus, it has been observed that the composition of the present invention, demonstrates enhanced, efficacious and superior behaviour in the fields. In fact, various advantageous properties associated with the compositions according to the invention, include, but are not limited to improved stability, improved toxicological and/or ecotoxicological behaviour, improved crop characteristics such as improved nutrient content, more developed root system, increase in plant height, bigger leaf blade, less dead basal leaves, stronger tillers, greener leaf color, less fertilizers needed, increased tillering, increased shoot growth, improved plant vigor, earlier flowering, more productive tillers, less plant verse (lodging), improved chlorophyll and protein content of the leaves, photosynthetic activity, early seed germination, early grain maturity, improved quality of the produce, improved fortification of the plant, conditioning the soil along with an improvement in the crop yield and as well as an enhancement in the disease control. Also, the compositions of the inventions are suitable for drip irrigation or sprinkler irrigation, in addition to other methods of applications of the agricultural compositions, in which most of the commercial products fail.

Through the composition of the present invention, the number of applications or the amount of nutrients, fertilizers or pesticides are minimized. The composition is highly safe to the user and to the environment.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

We claim:

1. A water dispersible granular composition for crop nutrition and fortification composition, wherein the composition comprises:
    elemental sulphur in the range of from 1% to 90% by weight of the total composition;
    at least one manganese salt or mixtures thereof in the range of from 0.1% to 70% by weight of the total composition; and,
    at least one dispersing agent in the range of from 1%-30% w/w of the total composition; and, wherein the granules of the composition are in the range of from 0.1-2.5 mm and comprise particles in the size range of from 0.1 micron to 20 microns, and
    wherein the manganese salts comprise water insoluble manganese salts or water soluble manganese salts; and,
    wherein the water soluble manganese salts comprise one or more of manganese acetate, manganese diacetate, manganese gluconate, manganese bromide, manganese chloride, manganese iodide, manganese succinate, manganese fumarate, manganese nitrate, manganese dichloride, sodium manganate, potassium permanganate, manganese citrate, manganese bicarbonate, manganese dichromate, manganese fluorosilicate, manganese ammonium phosphate; manganese zinc ferrite, manganese chlorate tetrahydrate, manganese bromide, sodium manganate, manganese chelate or mixtures thereof.

2. The composition as claimed in claim 1, wherein the water insoluble manganese salts comprise at least one of manganese oxide, manganese (II) oxide, Ferrite Grade MnO, manganese (II,III) oxide ($Mn_3O_4$), manganese (III) oxide ($Mn_2O_3$), manganese (VI) oxide ($MnO_3$), manganese (VII) oxide ($Mn_2O_7$), trimanganese tetraoxide, manganese hydroxide, manganese dihydroxide, rhodochrosite, manganese phosphate, manganese phosphate heptahydrate, manganese (II) phosphate, manganese diphosphate, manganese phosphate tribasic, carbonyl manganese, manganese dioxide, manganese dioxide ($MnO_2$), manganese diselenide, manganese tetroxide, manganese carbonate, manganese molybdate, manganese selenide, manganese telluride, manganese titanate, manganese nitride, manganese oxalate, manganese ferrocyanide, manganese fluoride, manganese borate, manganese sulphide, dimanganese trioxide, manganese peroxide, manganese ferrocyanide, manganese black, pyrolusite, or mixtures thereof.

3. The water dispersible granular composition as claimed in claim 1, wherein the granules of the composition are in a size range of 0.1 mm to 1.5 mm.

4. The water dispersible granular composition as claimed in claim 1, wherein the granules of the composition comprise particles in the size range of 0.1 to 10 microns.

5. The water dispersible granular composition as claimed in claim 1, wherein the weight ratio of one or more of manganese salts or mixtures thereof to elemental Sulphur is 1:90 to 70:1.

6. The water dispersible granular composition as claimed in claim 1, wherein the composition further comprises one or more agrochemically acceptable excipients selected from disintegrating agents, wetting agents, binders or fillers or carriers or diluents, buffers or pH adjusters or neutralizing agents, antifoaming agents, drift reducing agents, anticaking agents, spreading agents, penetrating agents, sticking agents and mixtures thereof.

7. The water dispersible granular composition as claimed in claim 1, wherein the composition has a dispersibility of at least 40%.

8. A process of preparation of the water dispersible granular composition for crop nutrition and fortification as claimed in claim 1, wherein the process comprises:
  a. milling a blend of elemental sulphur, at least one manganese salts or mixtures thereof and at least one dispersing agent to obtain a slurry or wet mix; and,
  b. drying the slurry or wet mix to obtain the water dispersible granular composition as claimed in claim 2 with a granule size in the range of 0.1 mm to 2.5 mm and comprising particles in the size range of 0.1 micron to 20 microns.

9. A method of improving plant health or yield, the method comprising treating at least one of a plant, a plant propagation material, locus or parts thereof, a seed, seedling or surrounding soil with the crop nutrition and fortification composition as claimed in the claim 1.

\* \* \* \* \*